(12) United States Patent
Xie et al.

(10) Patent No.: US 12,270,360 B2
(45) Date of Patent: Apr. 8, 2025

(54) OFF-ROAD VEHICLE AND ENGINE THEREOF

(71) Applicant: Zhejiang CFMOTO Power Co., Ltd., Zhejiang (CN)

(72) Inventors: Lebang Xie, Hangzhou (CN); Xiangyuan Dang, Hangzhou (CN); Linglong Meng, Hangzhou (CN); Jiayao Zhu, Hangzhou (CN); Xiaolei Zhang, Hangzhou (CN); Xuefeng Li, Hangzhou (CN); Suce Tang, Hangzhou (CN)

(73) Assignee: Zhejiang CFMoto Power Co. Ltd., Zhejiang (CN)

( * ) Notice: Subject to any disclaimer, the term of this patent is extended or adjusted under 35 U.S.C. 154(b) by 0 days.

(21) Appl. No.: 18/144,532

(22) Filed: May 8, 2023

(65) Prior Publication Data

US 2023/0313763 A1 Oct. 5, 2023

Related U.S. Application Data

(63) Continuation of application No. PCT/CN2020/142589, filed on Dec. 31, 2020.

(30) Foreign Application Priority Data

Nov. 16, 2020 (CN) .......................... 202011282152.7

(51) Int. Cl.
| | |
|---|---|
| *F02M 25/08* | (2006.01) |
| *F02F 1/40* | (2006.01) |
| *F02F 1/42* | (2006.01) |

(52) U.S. Cl.
CPC ........... *F02M 25/0836* (2013.01); *F02F 1/40* (2013.01); *F02F 1/4285* (2013.01)

(58) Field of Classification Search
CPC ...... F02M 25/0836; F02F 1/40; F02F 1/4285; F01N 1/00; F01N 3/10; F01N 3/303;
(Continued)

(56) References Cited

U.S. PATENT DOCUMENTS

| | | | |
|---|---|---|---|
| 6,220,020 B1 | 4/2001 | Takahashi et al. | |
| 7,562,736 B2 * | 7/2009 | Eguchi ............... | F02M 37/0076 180/291 |

(Continued)

FOREIGN PATENT DOCUMENTS

| | | |
|---|---|---|
| CN | 2866847 Y | 2/2007 |
| CN | 101092897 A | 12/2007 |

(Continued)

*Primary Examiner* — Grant Moubry
(74) *Attorney, Agent, or Firm* — Shewchuk IP Services, LLC; Jeffrey D. Shewchuk

(57) ABSTRACT

An off-road vehicle includes a frame and an engine. The engine includes a cylinder block and a cylinder head, on which an exhaust passage is arranged. The cylinder head is provided with a supplementary air supply passage for mixing air into the exhaust gas discharged from the combustion chamber. Alternatively, the supplementary air supply passage can be included in the exhaust system, such as in a cylinder head mounting flange of the exhaust pipe, upstream of an oxygen sensor and first and second stage catalytic converters. The exhaust gas from the engine is further oxidized by air, which reduces the content of components such as CO and NOx in the exhaust gas, improving environmental protection.

20 Claims, 27 Drawing Sheets

(58) Field of Classification Search
CPC . F01N 3/34; F01N 13/08; F01N 13/10; F01N 2230/06; F01N 2340/02; F01N 2340/04; F01N 2560/025; F01N 2590/04; B62J 40/10; B62J 37/00; B62K 5/01; B62M 7/02; Y02T 10/12; Y02T 10/40; Y02A 50/20

See application file for complete search history.

(56) References Cited

U.S. PATENT DOCUMENTS

| | | | |
|---|---|---|---|
| 10,954,882 B2 | 3/2021 | Kawelke | |
| 2003/0192502 A1 | 10/2003 | Joos et al. | |
| 2004/0216453 A1* | 11/2004 | Oshima | F01N 13/1822 60/322 |
| 2007/0079604 A1* | 4/2007 | Macaluso | F01N 3/30 60/306 |
| 2007/0240404 A1* | 10/2007 | Pekrul | F01N 3/22 60/289 |
| 2007/0266967 A1 | 11/2007 | Shirabe et al. | |
| 2008/0264395 A1* | 10/2008 | Araki | F01N 3/34 123/585 |
| 2009/0165765 A1* | 7/2009 | Araki | F01N 3/22 123/699 |
| 2012/0222414 A1* | 9/2012 | Shimizu | F01N 3/303 60/311 |
| 2016/0281577 A1* | 9/2016 | Kawakubo | F01N 3/05 |
| 2019/0120130 A1* | 4/2019 | Kuroiwa | F01N 13/00 |
| 2020/0191084 A1* | 6/2020 | Baron Von Ceumern-Lindenstjerna | F02D 41/068 |

FOREIGN PATENT DOCUMENTS

| | | |
|---|---|---|
| CN | 201835946 U | 5/2011 |
| CN | 202348385 U | 7/2012 |
| CN | 203335261 U | 12/2013 |
| CN | 107116342 A | 5/2017 |
| CN | 107035485 A | 8/2017 |
| CN | 210769057 U | 10/2019 |
| DE | 19808500 A1 | 11/1998 |
| EP | 1132586 A2 | 9/2001 |
| EP | 1749988 A | 2/2007 |
| JP | H0454212 A | 2/1992 |
| JP | 05340240 A | 12/1993 |
| JP | 2000018031 A | 1/2000 |
| JP | 2001355440 A | 12/2001 |
| JP | 2005201218 A | 7/2005 |
| JP | 2018162668 A * | 10/2018 |

* cited by examiner

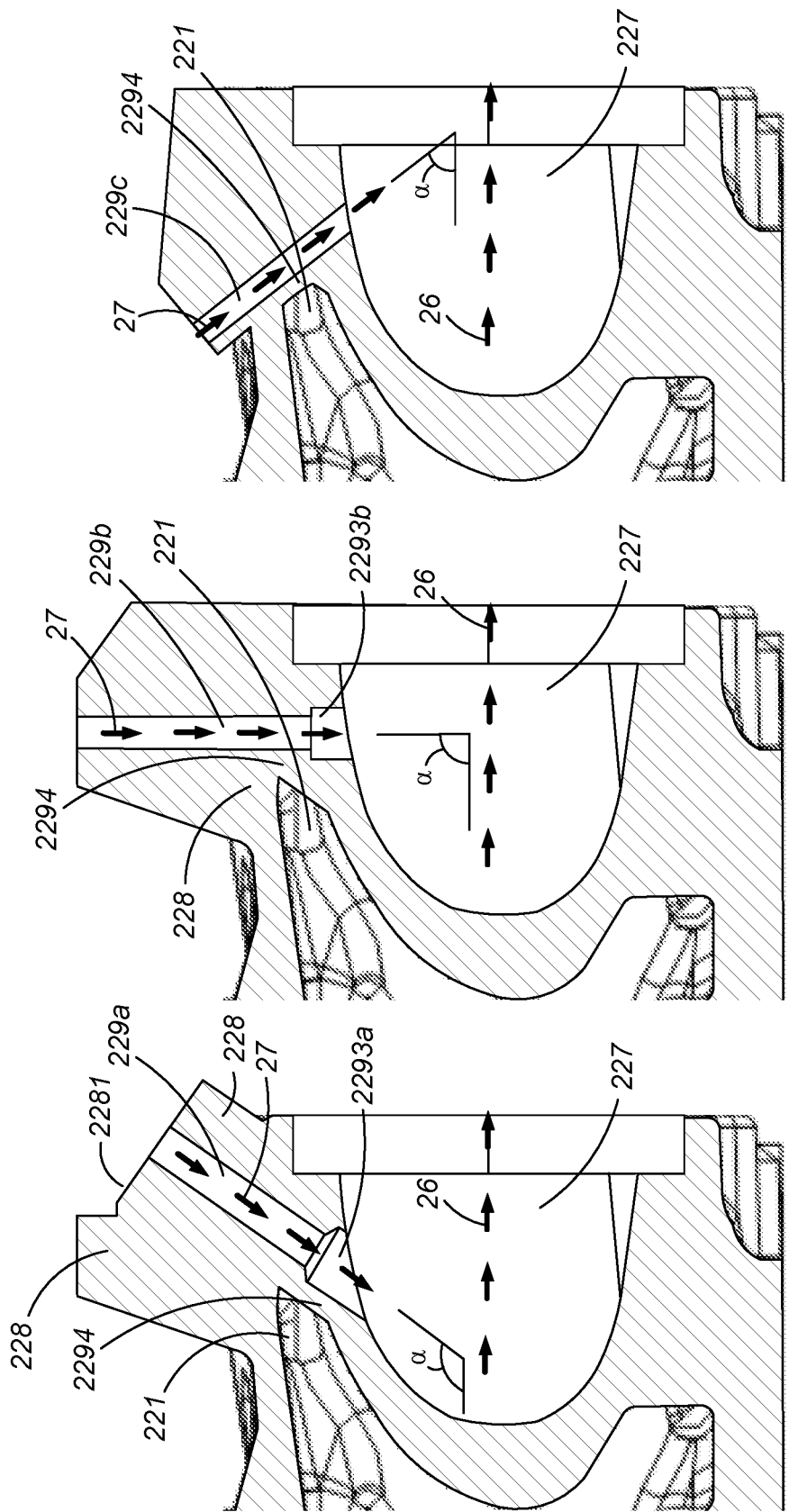

OFF-ROAD VEHICLE AND ENGINE THEREOF

RELATED APPLICATION INFORMATION

The present application is a continuation of PCT/CN2020/142589 filed Dec. 31, 2020, which claims the benefits of priority to Chinese Patent Application No. CN202011282152.7, filed with the Chinese Patent Office on Nov. 16, 2020. The entire contents of the above-referenced applications are incorporated herein by reference.

FIELD OF THE DISCLOSURE

The present application relates to an off-road vehicle and an engine thereof.

BACKGROUND OF THE DISCLOSURE

With the increasing desire for environmental protection, higher requirements are put forward for emission limits of off-road vehicles. For example, in 2016, the Euro IV standard was implemented for two-wheeled and three-wheeled motorcycles, and in 2017, the Euro IV standard was implemented for four-wheeled off-road vehicles. The European Union began to become increasingly stringent in the requirements for fuel evaporative emissions for two-wheeled off-road vehicles in the Euro 4 stage. The specific emission indicators of Euro 4 for carbon monoxide ("CO"), for total hydrocarbons ("THC"), for nitrogen oxides (NOx or "NO"), and for particulate matter ("PM"), expressed as milligram per kilometer traveled, are shown below in TABLE 1.

| Vehicle Type | Vehicle Name | Power Type | Drainage Grades | CO | THC | NO | PM | Test cycle |
|---|---|---|---|---|---|---|---|---|
| | | | IV | $L_1$ (mg/km) | $L_2$ (mg/km) | $L_3$ (mg/km) | $L_4$ (mg/km) | |
| L1e-A[1] | Electic Bike | Spark Ignition/ Compression Ignition/ Hybrid Vehicle | IV | 560 | 100 | 70 | | ECE-R47 |
| L1e-B | Two-wheeled Motorcycle | Spark Ignition/ Compression Ignition/ Vehicle Hybrid | IV | 1000 | 630 | 170 | | ECE R47 |
| L2e | Three-wheeled Motorcycle | Spark Ignition/ Compression Ignition/ Hybrid Vehicle | IV | 1900 | 730 | 170 | | ECE R47 |
| L3e[2] L4e[3] L5e-A[4] L7e-A | Two-wheeled Motorcycle with or without sidecar body Three-wheeled Motorcycle (except for L5e-B) Heavy road four-wheeled vehicle | Spark Ignition/ Compression Ignition/ Hybrid Vehicle Vmax < 130 km/h | IV | 1140 | 380 | 70 | | WMTC, 2-stage |
| | | Spark Ignition/ Compression Ignition/ Hybrid Vehicle Vmax ≥ 130 km/h | IV | 1140 | 170 | 90 | | WMTC, 2-stage |
| | | Spark Ignition/ Compression Ignition/ Hybrid Vehicle | IV | 1000 | 100 | 300 | 80 | WMTC, 2-stage |
| L5e-B | Commercial Tricycle | Spark Ignition/ Compression Ignition/ Hybrid Vehicle | IV | 2000 | 550 | 250 | | ECE R40 |
| | | Spark Ignition/ Compression Ignition/ Hybrid Vehicle | IV | 1000 | 100 | 550 | 80 | ECE R40 |

Higher requirements for emission standards are needed in various countries with the increasing demand for environmental protection. Therefore, there is a need to reduce the emission output values of off-road vehicle engines, so as to improve the environmental performance indicators of such vehicles.

SUMMARY OF THE DISCLOSURE

The objective of the present application is to provide an engine capable of reducing emissions and an off-road vehicle using the engine.

An off-road vehicle includes a frame, an engine, front wheels, rear wheels, a fuel supply system, a vehicle cover, a dashboard/instrument panel, a controller, a suspension system, and the like. The suspension system includes a front suspension and a rear suspension, the front wheels are connected to the frame by the front suspension, and the rear wheel are connected to the frame by the rear suspension. The engine is provided with a combustion chamber, and the engine includes a cylinder block, a cylinder head, a cylinder head cover, a crankcase, a transmission, an air intake system, and an exhaust system. Supplementary air is taken into the air intake system, and added into the exhaust stream(s) such as in the cylinder head(s) or in a cylinder head attachment flange(s) of the exhaust system. The exhaust system preferably includes an oxygen sensor, a multi-stage catalytic converter(s) and a muffler downstream of where the supplementary air is added to the exhaust stream.

BRIEF DESCRIPTION OF THE DRAWINGS

FIG. 9 is an enlarged view of the right side of FIG. 8.

FIG. 10 is an enlarged longitudinal cross-sectional portion view of an alternative cylinder head similar to that shown in FIGS. 8 and 9, but in which the vector angle between a flow direction of supplementary air flowing into the exhaust passage and a flow direction of the exhaust gas flowing through the exhaust passage is equal to 90°.

FIG. 11 is an enlarged longitudinal cross-sectional view of a second alternative cylinder head similar to that shown in FIGS. 8 and 9, but in which the vector angle between a flow direction of supplementary air flowing into the exhaust passage and a flow direction of the exhaust gas flowing through the exhaust passage is less than 90°.

DETAILED DESCRIPTION

For better understanding of the above objects, features and advantages of the present disclosure, preferred embodiments of the present invention will be described in detail below with reference to the accompanying drawings. This disclosure should be understood according to general knowledge in the field unless specially indicated.

The terms "first" and "second" in the present disclosure and claims may be only for convenience of description to distinguish different components with the same name, and do not necessarily indicate the order or primary and secondary relationship. The general orientations of front, rear, up (upper), down (lower), left and right for the off-road vehicle 10 are based on the rider's perspective and are defined in part in FIG. 1.

Figure 1:
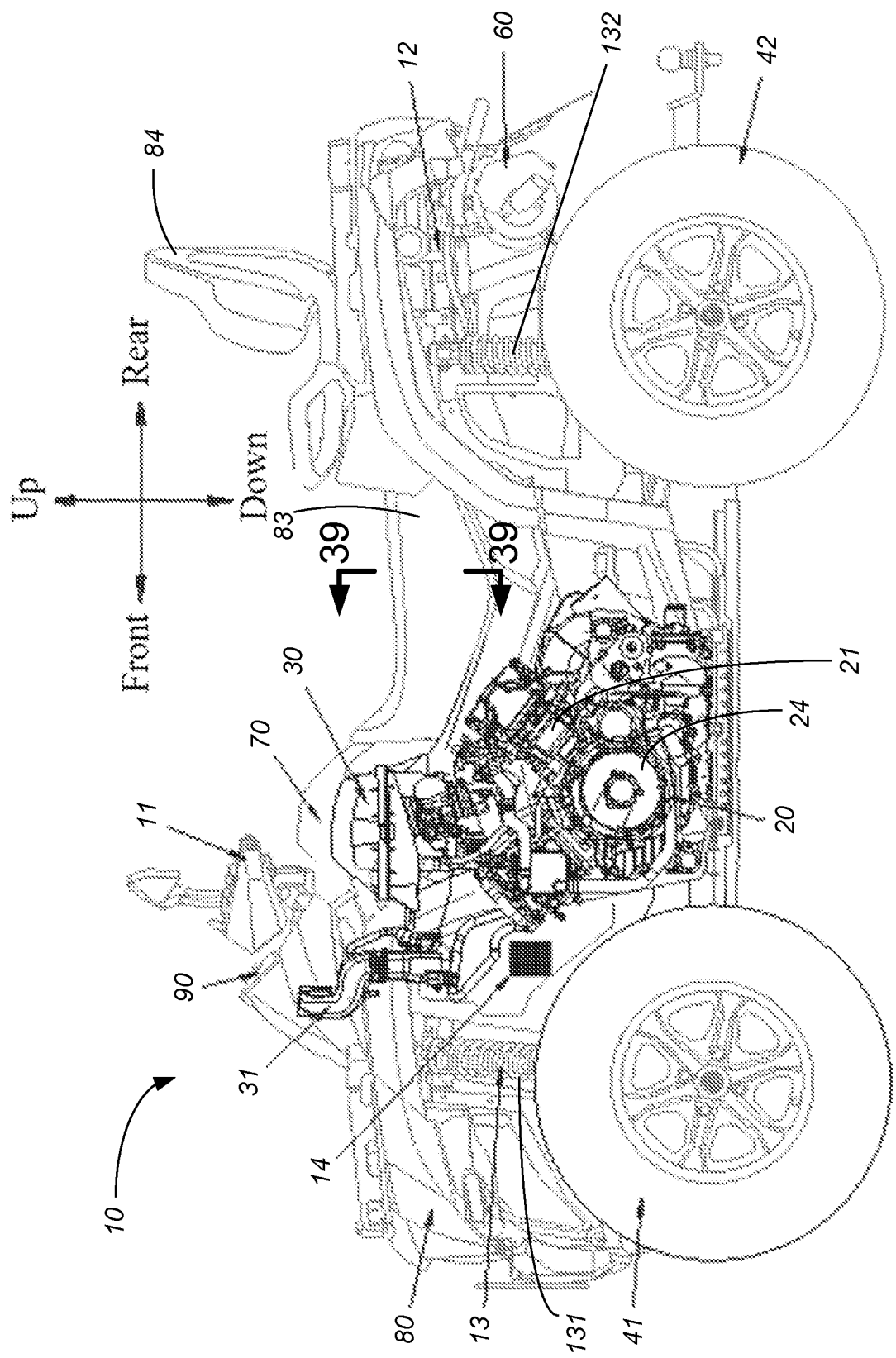
FIG. 1 is a left side view of an off-road vehicle according to a preferred embodiment of the invention.
Figure 2:
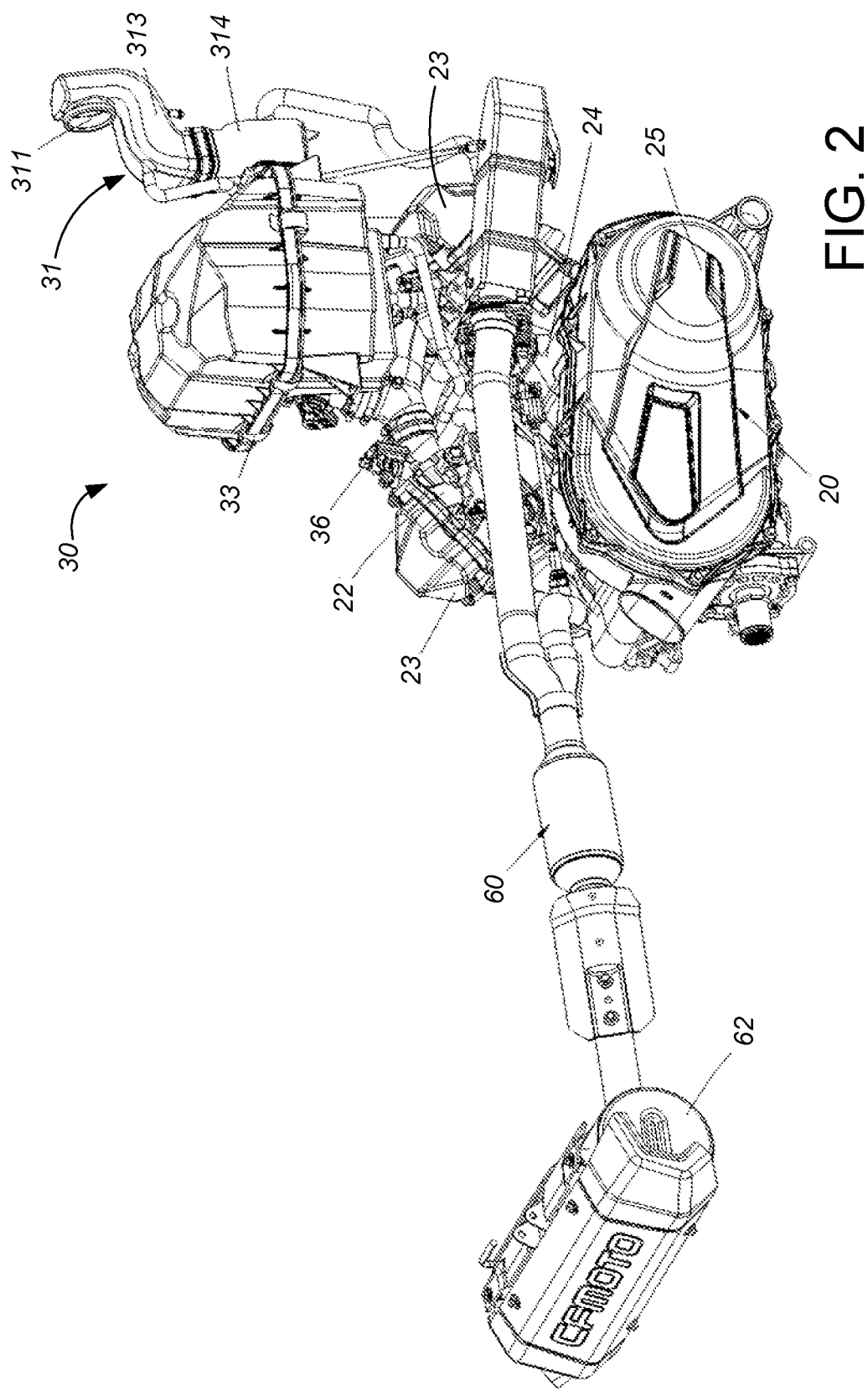
FIG. 2 is a rear right perspective view of the engine in the off-road vehicle of FIG. 1, including the air intake system and the exhaust system.

As shown in FIG. 1, a preferred off-road vehicle 10 includes a frame 12, an engine 20, front wheels 41, rear wheels 42, a fuel supply system 70, a vehicle cover 80, a dashboard 90, a steering system 11, a suspension system 13, and a controller 14. The engine 20 is an internal combustion engine, in the depicted embodiment having two cylinders (front and rear) and with a continuously variable transmission (CVT) 25 shown in FIG. 2. The engine 20 operates using an air intake system 30 to drive the rear wheels 42 and/or the front wheels 41. Exhaust gases from the engine 20 are expelled through an exhaust system 60. The suspension system 13 includes a front suspension 131 connected to front wheels 41 at the front of the frame 12 and a rear suspension 132 connected to rear wheels 41 at the rear of the frame 12. The fuel supply system 70 for supplying fuel to the engine 20 is arranged on the frame 12. The controller 14 is preferably arranged at the middle, lower portion of one side of the frame 12.

Figure 3:
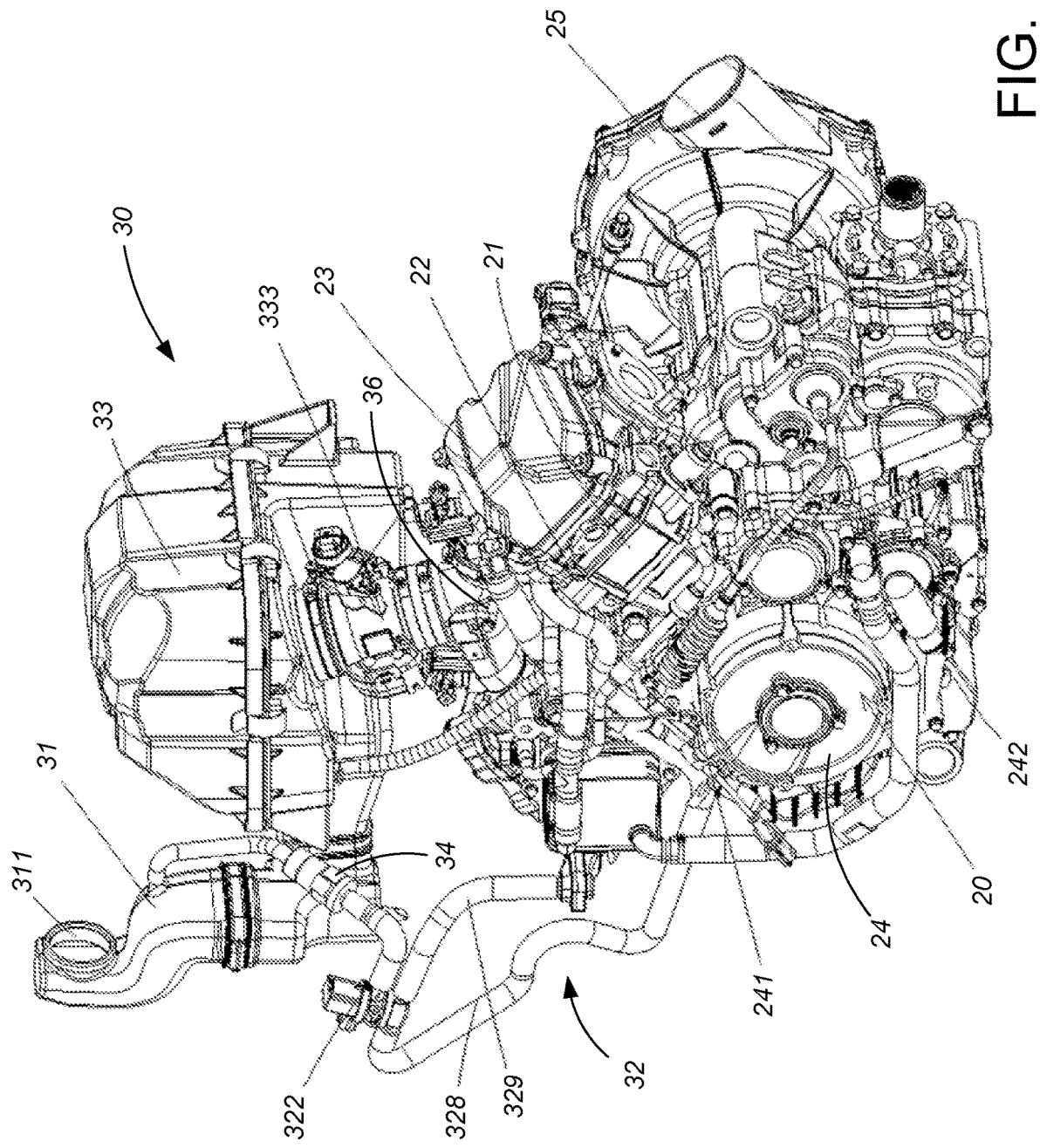
FIG. 3 is a rear left perspective view of the engine and air intake system of FIG. 2 without the exhaust system.
Figure 4:
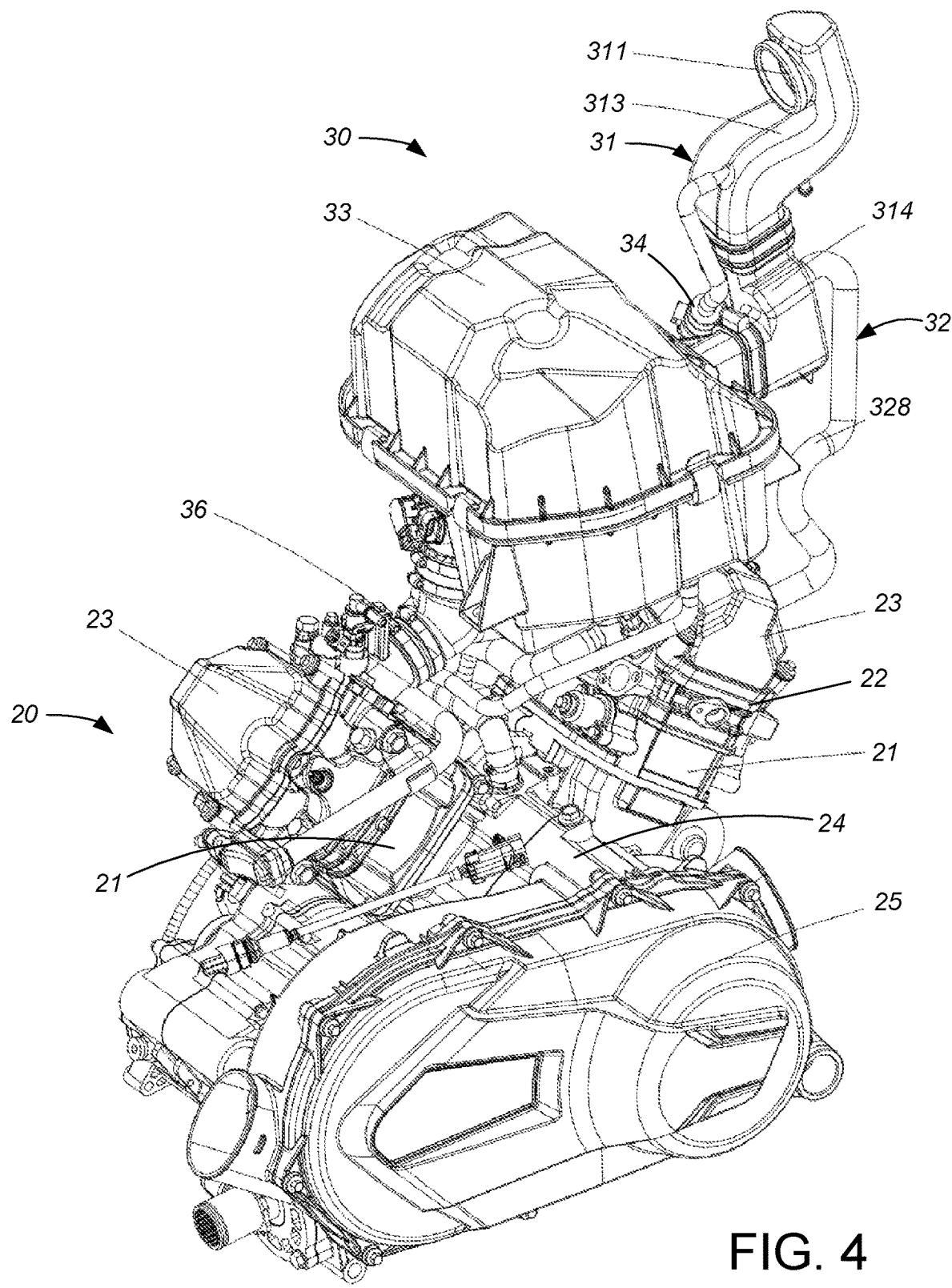
FIG. 4 a rear right perspective view of the engine and air intake system of FIGS. 2 and 3.

As shown in FIGS. 1, the engine 20 is located at the lower portion of the middle of frame 12, between the front wheels 41 and the rear wheels 42. As known in the field of internal combustion engines, each cylinder defines a combustion chamber, and fuel from the fuel supply system 70 is injected into air within the combustion chamber. A spark plug (not shown) ignites the fuel/air mixture in the combustion chamber to generate the power to push the piston (not shown) to move downward, turning an output shaft (not shown) in a crankcase 24, thus providing power for the off-road vehicle 10. The engine 20 is preferably naturally aspirated, but could alternatively include a turbocharger (not shown) or supercharger (not shown). As called out in FIGS. 2-4, each cylinder includes a cylinder block 21, a cylinder head 22 and a cylinder head cover 23. The crankcase 24 preferably includes an upper crankcase shell 241 sealed to a lower crankcase shell 242. The upper crankcase shell 241 may be integrally molded with the cylinder block 21. The lower crankcase shell (also called oil sump) 242 is generally used to store lubricating oil. The cylinder head 22 is mounted on the cylinder block 21 and seals cylinder block 21 from the top. The cylinder head cover 23 is connected to the cylinder head 22 and seals the upper portion of the cylinder head 22 to define a closed cavity.

The air intake system 30 includes an intake passage 31 with an air inlet 311. In the preferred embodiment, the air inlet 311 is defined on the side wall of the intake passage 31 facing towards the rear wheels 42, to achieve natural suction and maintain a stable air intake. The air inlet 311 is positioned adjacent to the dashboard/instrument panel 90, which can increase the height of the air inlet 311 thereby keeping the air entering through the air inlet 311 cleaner. The preferred intake passage 31 first includes a downwardly extending segment 313 and then includes a corner segment 314, both shown in FIGS. 2 and 4 and further described with reference to FIG. 12. Air introduced through the intake passage 31 is fed through an engine air filter 33 to a main air intake manifold 36 where the air flow splits to enter each of the cylinders.

Figure 5:
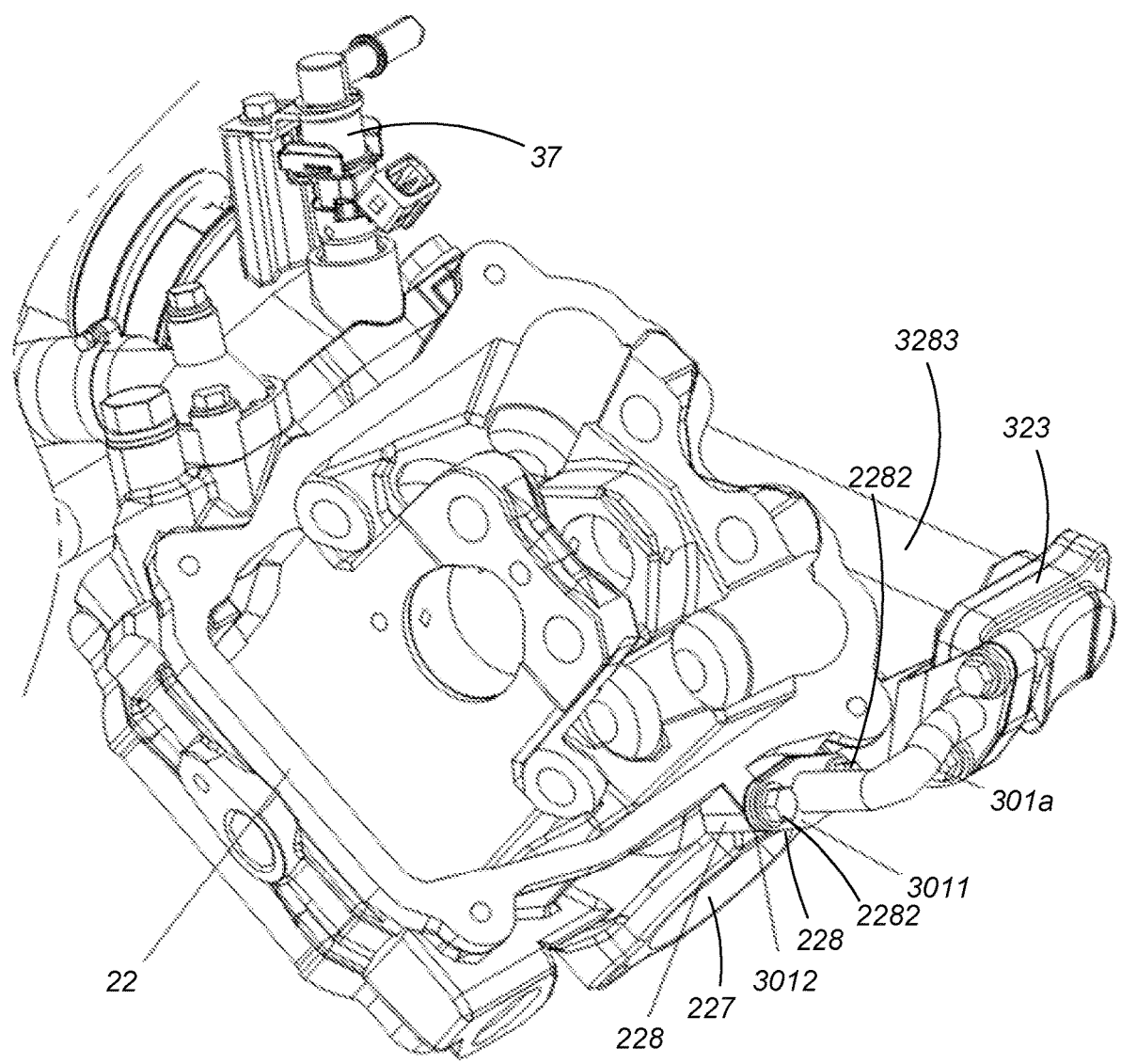
FIG. 5 is a rear left perspective view of the cylinder head (with the cylinder head cover and valves removed) an supplementary air supply pipe in the engine of FIGS. 2-4.
Figure 6:
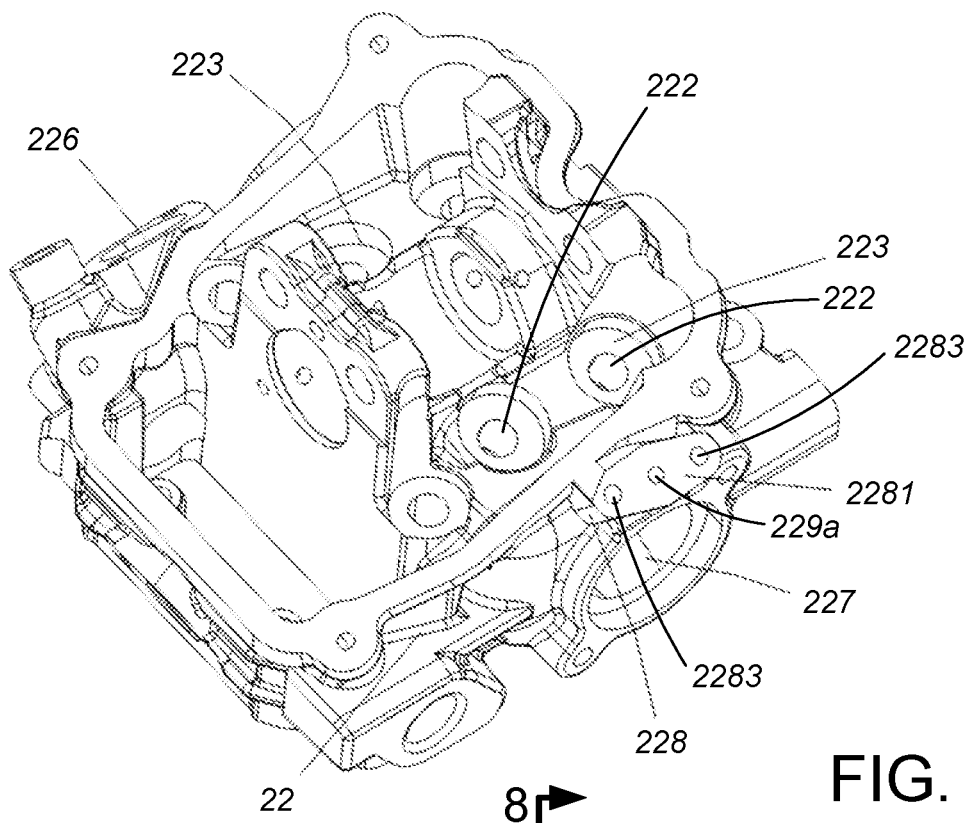
FIG. 6 is a rear left perspective view of the cylinder head of FIG. 5.
Figure 7:
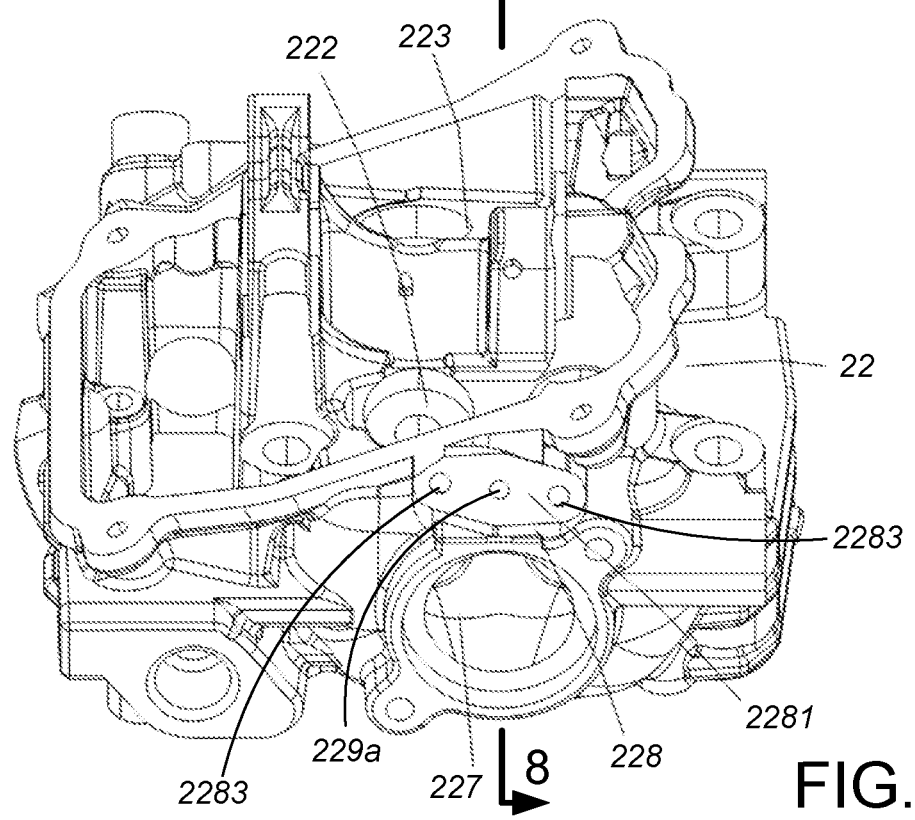
FIG. 7 is a rear perspective view of the cylinder head of FIGS. 5 and 6.
Figure 8:
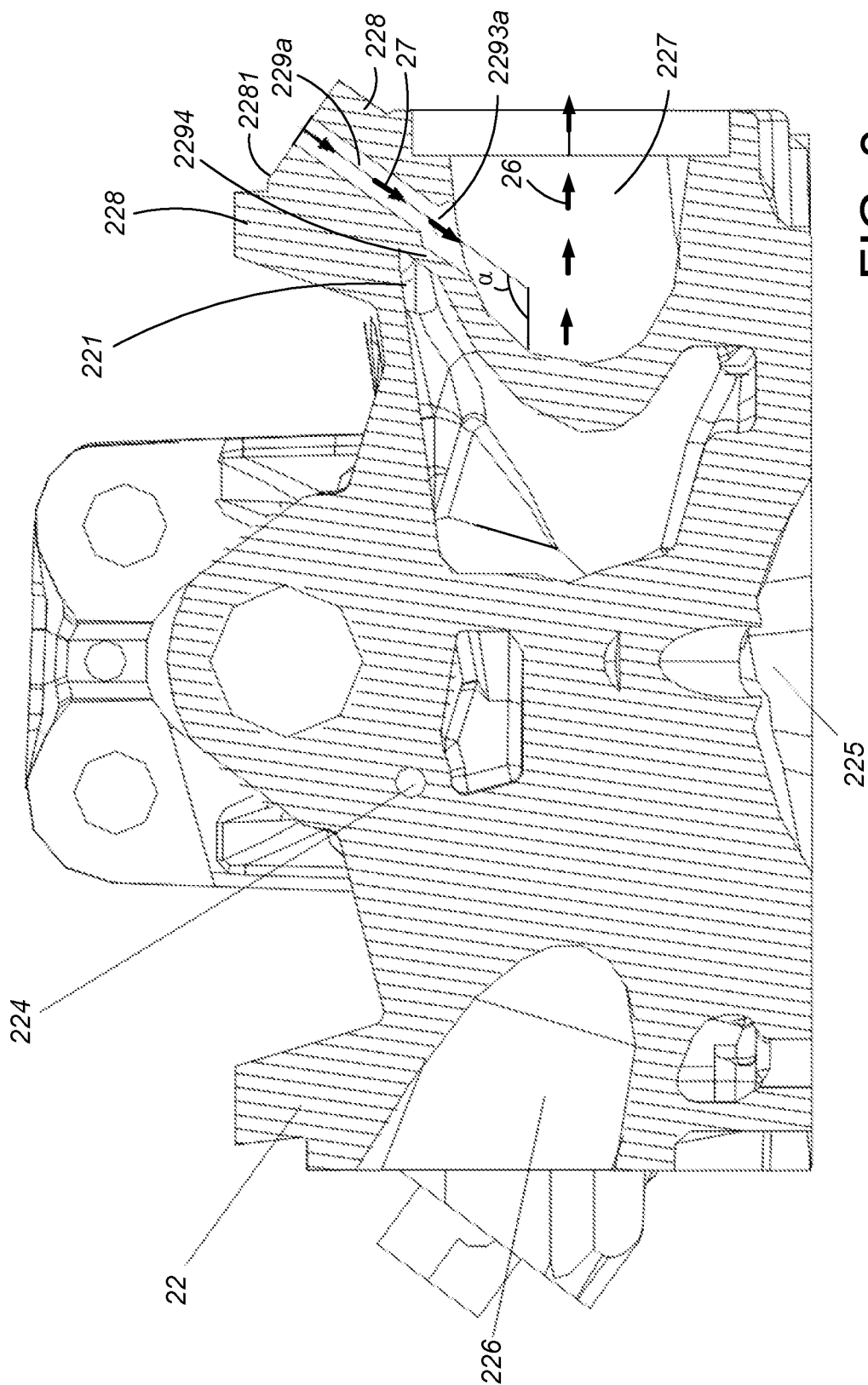
FIG. 8 is a longitudinal cross-sectional view of cylinder head of FIGS. 5-7, taken along cut lines 8-8 from FIG. 7, in which the vector angle between a flow direction of supplementary air flowing into the exhaust passage and a flow direction of the exhaust gas flowing through the exhaust passage is greater than 90°.

The top side of a first preferred cylinder head 22 in accordance with the present invention is shown in FIGS. 5-7 with the cylinder head cover 23 and valves removed, with FIGS. 8 and 9 showing a cross-sectional view. As called out in FIGS. 7 and 8, the cylinder head 22 defines a cooling water passage 221, a plurality of holes 222 for mounting valves (not shown), a plurality of cavities 223 for mounting valve springs (not shown), a lubricating oil passage 224 and a cavity 225 defining the top of the combustion chamber. An air intake passage 226 communicates with the cavity 225 for the combustion chamber through one or more of the valves, and an exhaust passage 227 is in fluid communication with the cavity 225 for the combustion chamber through another one or more of the valves. The exhaust gas generated in the combustion chamber is discharged through the exhaust passage 227, and the cooling water passage 221 may be predominantly on the exhaust side of the cylinder head 22 (which runs hotter than the intake side of the cylinder head 22).

A supplementary air supply passage 229a is defined on the cylinder head 22 so as to be in fluid communication with the exhaust passage 227. Additional air flows into the exhaust passage 227 from the supplementary air supply passage 229a to further oxidize the exhaust gas passing through the exhaust passage 227. The further oxidation of the exhaust gas from combustion reduces the tested exhaust emissions value of CO to below 700 mg/km, the tested exhaust emissions value of non-methane hydrocarbons ("NMHC") to below 47.6 mg/km, and the tested exhaust emissions value of THC to below 70 mg/km. The exhaust passage 227 has a centerline generally defining an exhaust flow direction shown by arrows 26 in FIGS. 8 and 9, and the supplementary air supply passage 229a has a centerline generally defining an air flow direction shown by arrows 27 in FIGS. 8 and 9. In this embodiment, the vector angle α between the two centerlines is greater than 90°, with FIGS. 8 and 9 showing a preferred vector angle α of about 125°.

The preferred supplementary air supply passage 229a includes an air flow buffer zone 2293a near its outlet into the exhaust passage 227. The cross-sectional area of the air flow buffer zone 2293a is larger than that of the rest of the supplementary air supply passage 229a. The shape of the air flow buffer zone 2293a may be conical as shown in FIG. 9, or alternatively could be flared with an increase in diameter like a trumpet bell, or alternatively could be hemispherical, or alternatively could be a step change to an air flow buffer zone 2293b with a larger cylindrical shape as shown in FIG. 10. The speed of air flowing out of the supplementary air supply passage 229a slows down in the air flow buffer zone 2293a. Due to its much smaller cross-sectional area, the air flow rate through the supplementary air supply passage 229a is less than the exhaust flow rate, even if the air speed through the supplementary air supply passage 229a is greater than the speed of the exhaust gases. As the air from the supplementary air supply passage 229a combines with exhaust gases, its air flow direction exiting the air flow buffer zone 2293a changes, making the air flow direction substantially the same as the exhaust gas flow direction.

The supplementary air supply passage 229a is not in fluid communication with any of the cooling water passage 221, the plurality of cavities 223 for mounting the intake valve springs, the camshaft lubricating oil passage 224, the cavity 225 for the combustion chamber (other than through the exhaust valve(s)) and/or the intake passage 226 defined on the cylinder head 22 (other than through the intake and exhaust valves). The supplementary air supply passage 229a is adjacent to the cooling water passage 221 with a barrier portion 2294 between them. The barrier portion 2294 is a portion of the cylinder head 22. The supplementary air supply passage 229a is partially defined on the barrier portion 2294, so the barrier portion 2294 provides space for the supplementary air supply passage 229a.

As shown in FIGS. 5-9, the preferred cylinder head 22 defines a supplementary air supply passage seat 228. A central axis of the supplementary air supply passage 229a is perpendicular to a top surface 2281 of the air supply passage seat 228. The intake system 30 includes a supplementary air supply pipe 301 (shown in FIGS. 5 and 12), through which air is input into the supplementary air supply passage 229a. A connection seat 3011 (FIG. 5) for securing the supplementary air supply pipe 301 is fixed on the air supply passage seat 228 by screws/bolts 2282 (FIG. 5) mating into screw holes 2283 (FIGS. 6 and 7) on the supplementary air supply passage seat 228. A sealing gasket 3012 (FIG. 5) is preferably arranged between the connection seat 3011 and the air supply passage seat 228, ensuring sealing performance.

FIG. 10 shows an alternative embodiment of the supplementary air supply passage 229b, different from the embodiment in FIGS. 8 and 9 in two ways. Firstly, in the embodiment of FIG. 10, the vector angle α between the flow direction of air flowing through the supplementary air supply passage 229b and the flow direction of the exhaust gas flowing through the exhaust passage is equal to 90°. Secondly, the transition from the air supply passage 229b to the air flow buffer zone 2293b is a step change rather than conical.

FIG. 11 shows another alternative embodiment of the supplementary air supply passage 229c. In this case, the vector angle α between the air flow direction within the supplementary air supply passage 229c and the flow direction of the exhaust gas flowing through the exhaust passage is less than 90°, with FIG. 11 showing a vector angle α of about 52°. In the case of the vector angle α being less than 90°, when air enters into the exhaust passage 227 from the supplementary air supply passage 229c, it can easily curve to flow in a substantially same direction with exhaust gas in the exhaust passage 227 with less resistance, so no air flow buffer zone is needed. The slant of the supplementary air supply passage 229c relative to vertical depends upon the orientation of the cylinder block 21 and the orientation of the cylinder head 22. Other embodiments (not shown) include an even more acute angle α between the central axis of the supplementary air supply passage 229c and the central axis of the exhaust passage 227, such as within the range of 10-30°.

Figure 12:
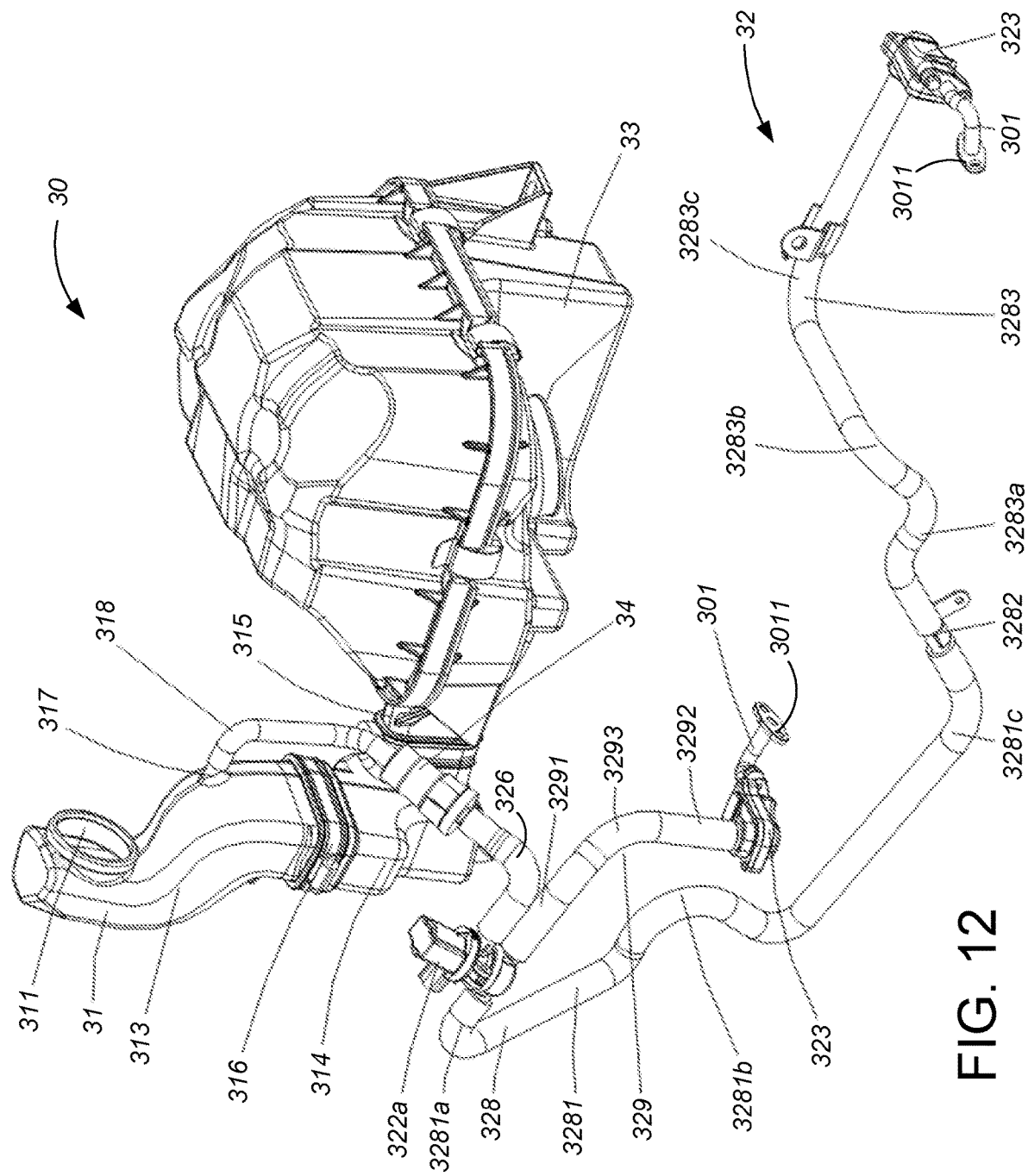
FIG. 12 is a rear left perspective view, from the same view point as FIG. 3, of the air intake system of FIGS. 1-4.

FIG. 12 shows how the preferred intake system 30 provides filtered air through the supplementary air supply pipe 301 to the supplementary air supply passage 229a, 229b, 229c. The intake system 30 includes a supplementary air supply line 32 with a supplementary air filter 34. The supplementary air supply line 32 preferably branches off the intake passage 31 such as via a branch pipe 318. The supplementary air filter 34 is separate and independent of the engine air filter 33, even though both share the same air intake passage 31. The supplementary air supply pipe 301 is in fluid communication with the supplementary air filter 34.

The air intake passage 31 includes the downwardly extending segment 313, the corner segment 314 and then a horizontally extending segment 315. The corner segment 314 may be an L-shaped hose. One end of the corner segment 314 is sleeved onto the bottom end of the downwardly extending segment 313, with a tension ring 316 such as a hose clamp locked at a joint of the downwardly extending segment 313 and the corner segment 314, ensuring the connection tightness and airtightness of the intake passage 31. The horizontally extending segment 315 preferably extends substantially longitudinally on the vehicle 10, with one end connected to the engine air filter 33, and the other end connected to the corner segment 314.

Figure 13:
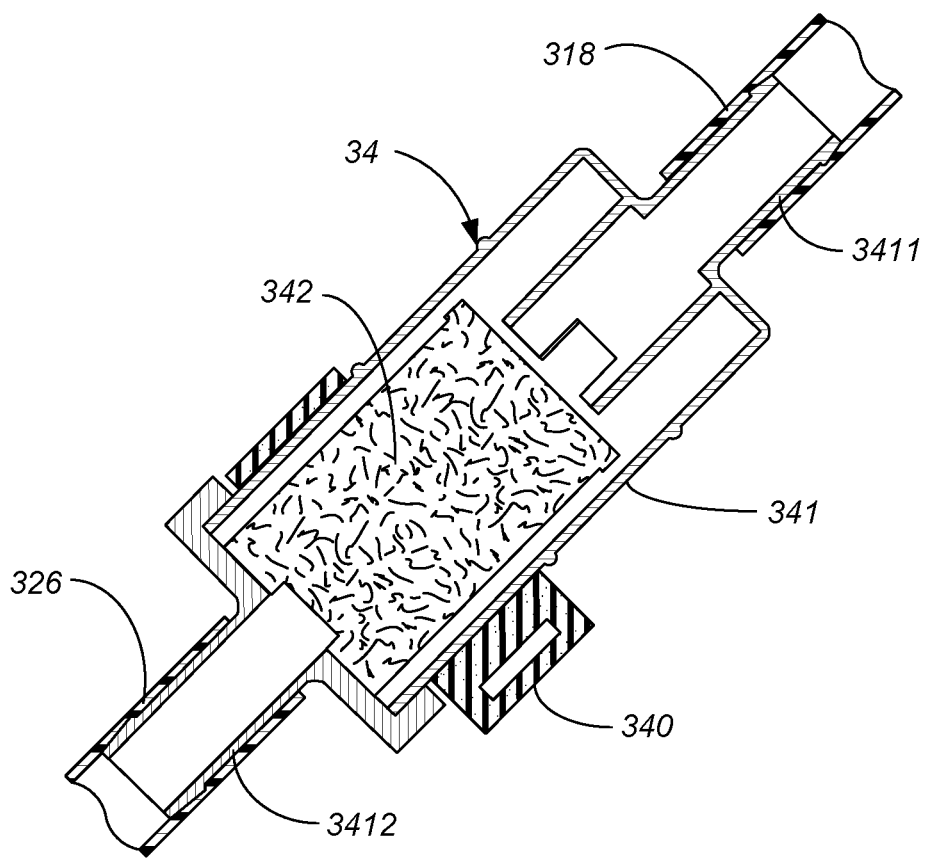
FIG. 13 is a cross-sectional view, taken along its center line, of the supplementary air filter in FIGS. 3, 4 and 12.

FIG. 13 shows a cross-sectional view of the preferred supplementary air filter 34. The supplementary air filter 34 has a tubular housing 341 and a filter paper 342 contained in the air filter housing 341. The filter paper 342 preferably fills only the bottom of the air filter housing 341, not entire air filter housing 341. Air in the supplementary air filter 34 flows through the filter paper 342 without significantly changing direction, which improves filtration efficiency for air. An inlet connection 3411 is defined at one end of the air filter housing 341, with an outlet connection 3412 defined at the other end of the air filter housing 341. The branch pipe 318 is sleeved onto the inlet connection 3411. The supplementary air filter 34 may include a rubber sleeve 340 to fix the housing 341 of the supplementary air filter 34 to the frame 12.

In the preferred embodiment, a pipe joint 317 for the branch pipe 318 is defined on one side wall of the intake passage 31. The linear distance from the pipe joint 317 to the instrument panel 90 is greater than the linear distance from the air inlet 311 to the instrument panel 90. The pipe joint 317 is connected to the branch pipe 318, which is connected to the supplementary air filter 34. After entering the intake passage 31 via the air inlet 311, a portion of the fresh air enters the branch pipe 318 through the pipe joint 317, and then enters the supplementary air filter 34.

As shown in FIG. 12, the preferred supplementary air supply line 32 includes an on-off or switched valve 322a connected to and in communication with the outlet end of the supplementary air filter 34 (through a pipeline), as well as a one-way valve or check valve 323 for each cylinder. The on-off valve 322a may be selected from the group consisting of duty ratio solenoid valve, a normally open solenoid valve and a normally closed solenoid valve. The on-off valve 322a is controlled by the controller 14 of the off-road vehicle 10, which may be an on-board computer. In an alternative embodiment, the off-road vehicle 10 further includes a dedicated valve controller (rather than the controller 14) for controlling the on-off valve 322a. The dedicated valve controller may be an electronic control unit (ECU).

One preferred control scheme for the on-off valve 322a depends upon a sensed temperature of coolant flowing through the engine 20. When the engine 20 is started and the coolant is cold, the on-off valve 322a is opened. Air filtered by the supplementary air filter 34 enters the supplementary air supply pipes 301 after passing through the on-off valve 322a, thus, the supplementary air supply in the cold engine stage is realized. When the engine coolant reaches a preset temperature, the on-off valve 322a is closed, stopping the delivery of air to the supplementary air supply pipes 301.

In the preferred two cylinder arrangement shown in FIG. 12, the on-off valve 322a has two outlet ends, splitting the outlet air flow into a front supplementary air supply pipe 329 for the front cylinder and a rear supplementary air supply pipe 328 for the rear cylinder. The front supplementary air supply pipe 329 includes a first straight pipe section 3291, a second straight pipe section 3292 and a curved pipe section 3293 connecting the first straight pipe section 3291 and the second straight pipe section 3292. It should be noted that the shape of the front supplementary air supply pipe 329 may be redesigned according to the layout of the engine and frame in other embodiments.

The rear supplementary air supply pipe 328 includes a first pipe body 3281 connected to the on-off valve 322a, a second pipe body 3283 extending from the left side of the engine 20 to the right side of the engine 20, and a pipe joint 3282 connected between the first pipe body 3281 and the second pipe body 3283. The pipe joint 3282 is preferably connected to the rear cylinder of the engine 20 by bolts. The first pipe body 3281 includes a first elbow portion 3281a, an arc-shaped pipe portion 3281b connected to the first elbow portion 3281a, and a second elbow portion 3281c connected to the arc-shaped pipe portion 3281b and to the pipe joint 3282. The second pipe body 3283 includes a first elbow portion 3283a, a second elbow portion 3283b connected to the first elbow portion 3283a, and a third elbow portion 3283c connected to second elbow portion 3283b and the one-way valve 323. It should be noted that the shapes of the first pipe body 3281 and the second pipe body 3282 may be redesigned according to the layout of the engine and frame in other embodiments.

Figure 14:
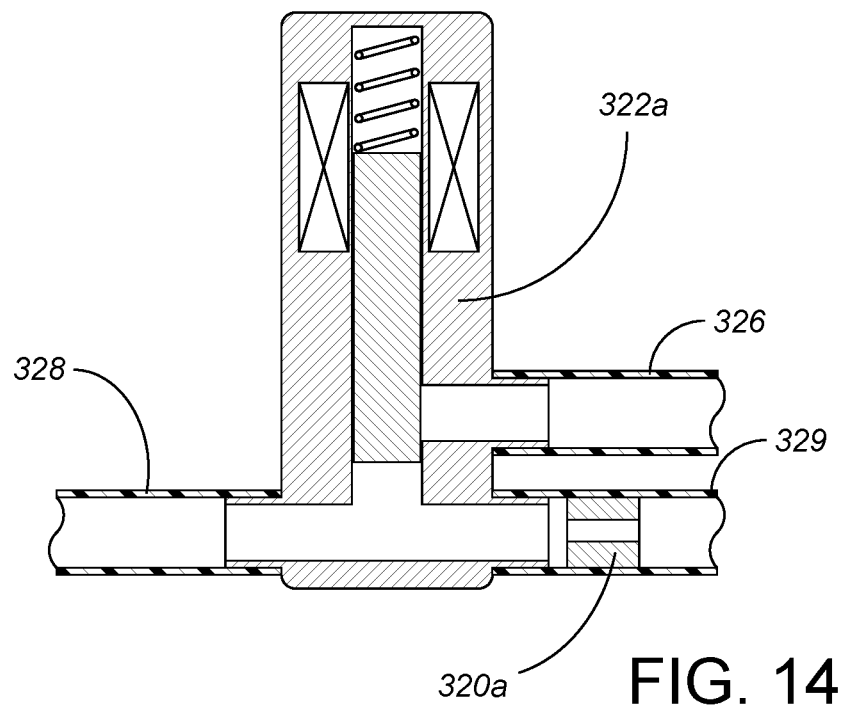
FIG. 14 is a cross-sectional view, taken along its center line, of the on-off valve and connected air supply pipes in the air intake system of FIGS. 1-4 and 12.

In the preferred embodiment, the length and tortuosity of the rear supplementary air supply pipe 328 is significantly greater than the length and tortuosity of the front supplementary air supply pipe 329, and the resistance to air flow is thus significantly greater through the rear supplementary air supply pipe 328 than through the front supplementary air supply pipe 329. Despite this, it is desired that the supplementary air flow be equally shared between the exhaust of the front and rear cylinders. FIG. 14 shows a feature to accomplish such equal front/rear supplementary air flow, in which the front supplementary air supply pipe 329 is provided with a throttling plug 320a. The throttling plug 320a narrows the internal diameter through a section of the front supplementary air supply pipe 329, so the overall air flow resistance through the entire length of the front supplementary air supply pipe 329 more closely equals the air flow resistance through the entire length of the rear supplementary air supply pipe 328. Thus, for any given layout, the front versus rear distribution of supplementary air flow through the on-off valve 322a can be directly controlled by adding an appropriately sized throttling plug 320a. In other embodiments, such as if the on-off valve 322a is closer to rear cylinder, the rear supplementary air supply pipe 328 is provided with a throttling plug. Alternatively, the front supplementary air supply pipe 329 and the rear supplementary air supply pipe 328 can both be provided with a throttling plug, with the internal diameter selected for each layout.

Figure 15:
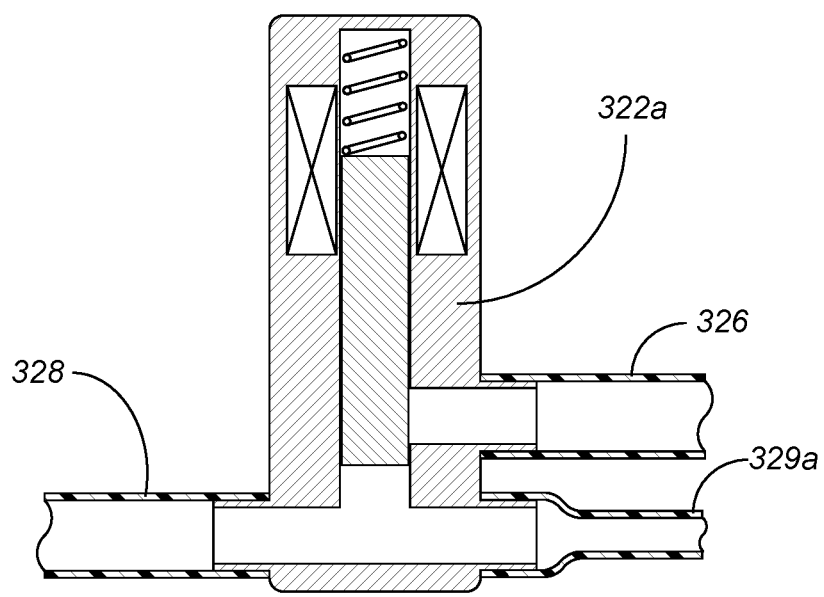
FIG. 15 is a cross-section view, taken along its center line, of the on-off valve of FIG. 14 with an alternative air supply pipe.

FIG. 15 shows an alternative design to accomplish substantially equal front/rear supplementary air flow. In the design of FIG. 15, the diameters of the front supplementary air supply pipe 329 and the rear supplementary air supply pipe 328 are different, with the internal diameter of the front supplementary air supply pipe 329a being smaller than the internal diameter of the rear supplementary air supply pipe 328. With a larger internal diameter, the rear supplementary air supply pipe 328 can be longer and more tortuous and still deliver the same supplementary air flow as the front supplementary air supply pipe 329a. Another alternative embodiment combines the strategies of FIGS. 14 and 15, i.e., using both one or more throttling plugs and using different internal diameters for the rear supplementary air supply pipe 328 as compared to the front supplementary air supply pipe 329. Any of these embodiments for generating substantially equal supplementary air flow through the multiple supplementary air supply pipes 328 and 329 can be used with any multi-cylinder embodiment of the invention.

Figure 16:
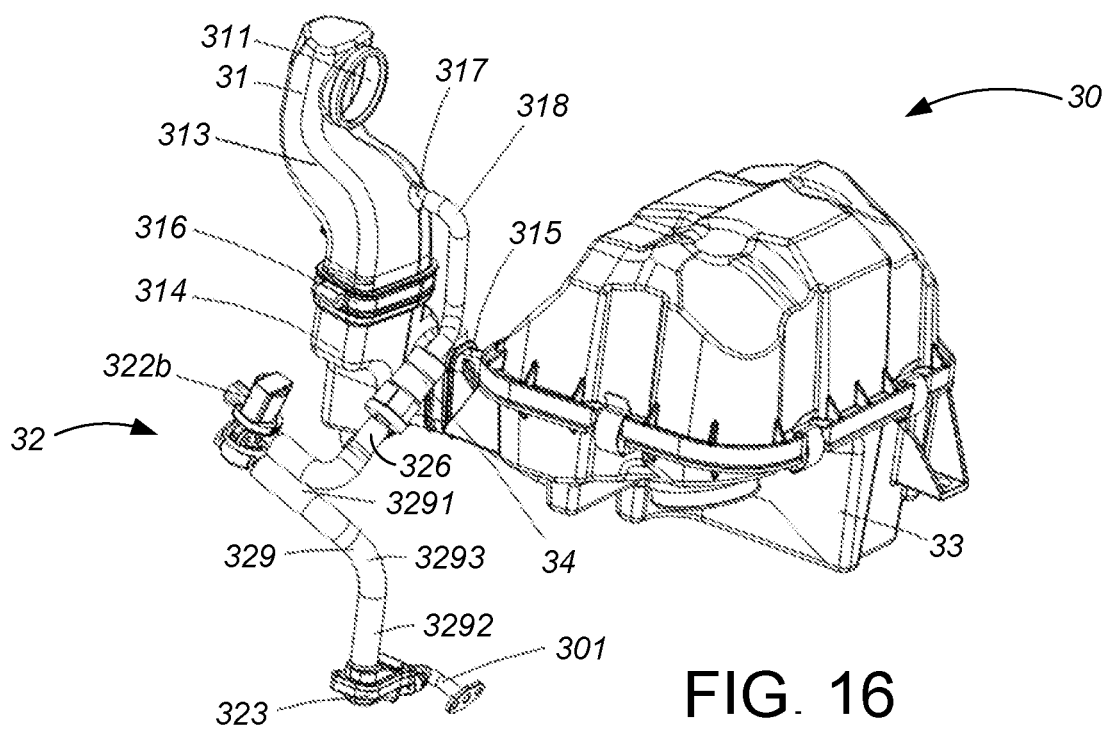
FIG. 16 is a rear left perspective view of an alternative air intake system, similar to FIG. 12 but corresponding to a single-cylinder engine.

In some embodiments, the engine is a single-cylinder engine. FIG. 16 shows the air intake system adapted for a single-cylinder engine. The on-off valve 322b is changed to only have a single outlet, and the rear supplementary air supply pipe 328 is omitted.

Figure 17:
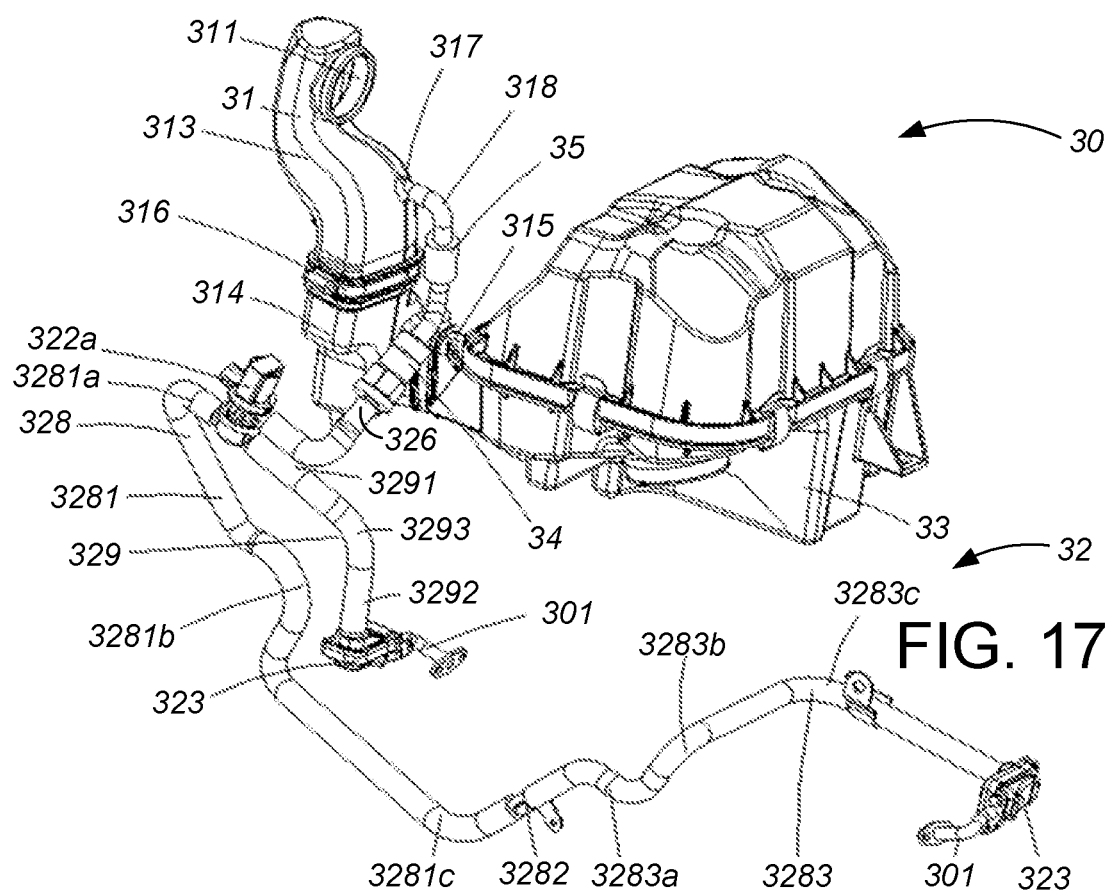
FIG. 17 is a rear left perspective view of an alternative air intake system, similar to FIG. 12 but adding an air pump.
Figure 18:
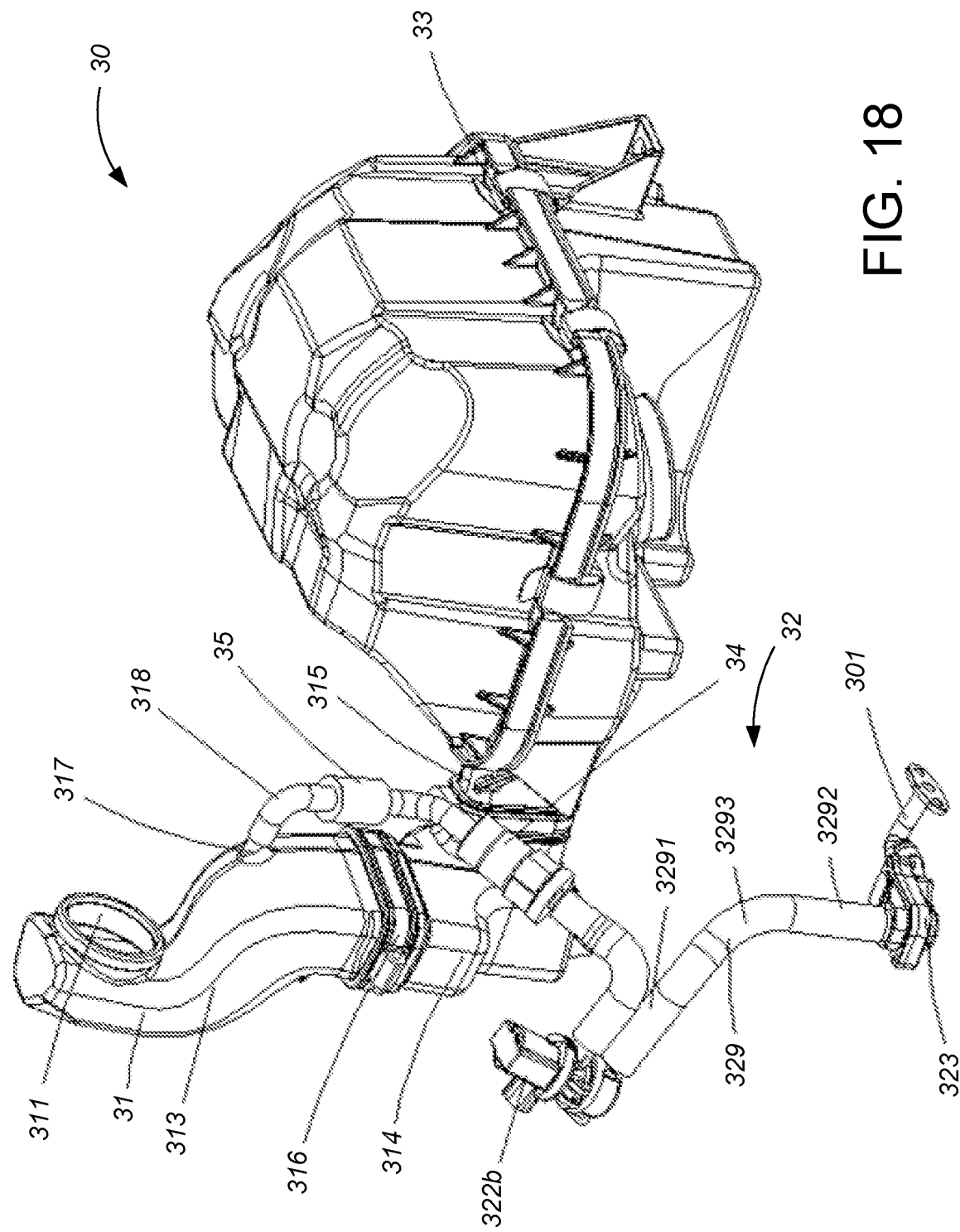
FIG. 18 is a rear left perspective view of an alternative air intake system, adding an air pump and corresponding to a single cylinder engine.

As an alternative to using natural aspiration to draw supplementary air through the intake system 30, an air pump for the supplementary air may be added. FIG. 17 shows such an embodiment. The intake system 30 further includes an air pump 35 that pumps air through the supplementary air filter 34. The controller 14 (shown in FIG. 1) controls the running of the air pump 35, and thereby controls the air supply volume of the air pump 35 to the supplementary air supply passage 229a, 229b, 229c and the air speed through the supplementary air supply passage 229a, 229b, 229c. In other embodiments, the off-road vehicle may further include dedicated air pump controller (not shown), and the air pump 35 is controlled by the dedicated air pump controller. The air pump 35 may be similarly added in the same location in the intake system for a single cylinder engine, shown in FIG. 18.

As an alternative to drawing the supplementary air out of the intake passage 31 prior to the air filter 33 and using an independent filter 34, the supplementary air may be taken out of the out of engine air filter 33 after passing through the engine air filter element, with the supplementary air filter 34 omitted. FIGS. 19-23 show such embodiments, including showing an exploded view of the engine air filter 33. The engine air filter 33 includes an air filter box 331 and air filter element 332. The air filter box 331 includes an upper shell 3311 removably connected to a lower shell 3312 by clips 3313. The removable connection allows easy replacement and maintenance of the air filter element 332 as known in the art.

The main intake manifold 36 (shown in FIGS. 2-4) is in fluid communication to transmit filtered air from the engine air filter 33 through one or more valves to the combustion chamber. The main intake manifold 36 is connected to a filter element support tube 333, which receives air after it has been filtered by the air filter element 332 and provides the outlet of the engine air filter 33.

In the embodiments of FIGS. 19-22, a branch pipe 327 has a pipe joint 3271 which connects into the filter element support tube 333, and the branch pipe 327 transmits filtered air from the engine air filter 33 to the on-off valve 322a, 322b. Like the embodiments of FIGS. 12 and 17, the on-off valve 322a is connected through to the supplementary air supply pipe 301 for the front cylinder through air supply line 329 and to the supplementary air supply pipe 301 for the rear cylinder through air supply line 328, each time through one-way valve 323. The filtered air added by supplementary air supply pipe 301 further oxidizes the exhaust gas when the engine 20 is started.

Figure 19:
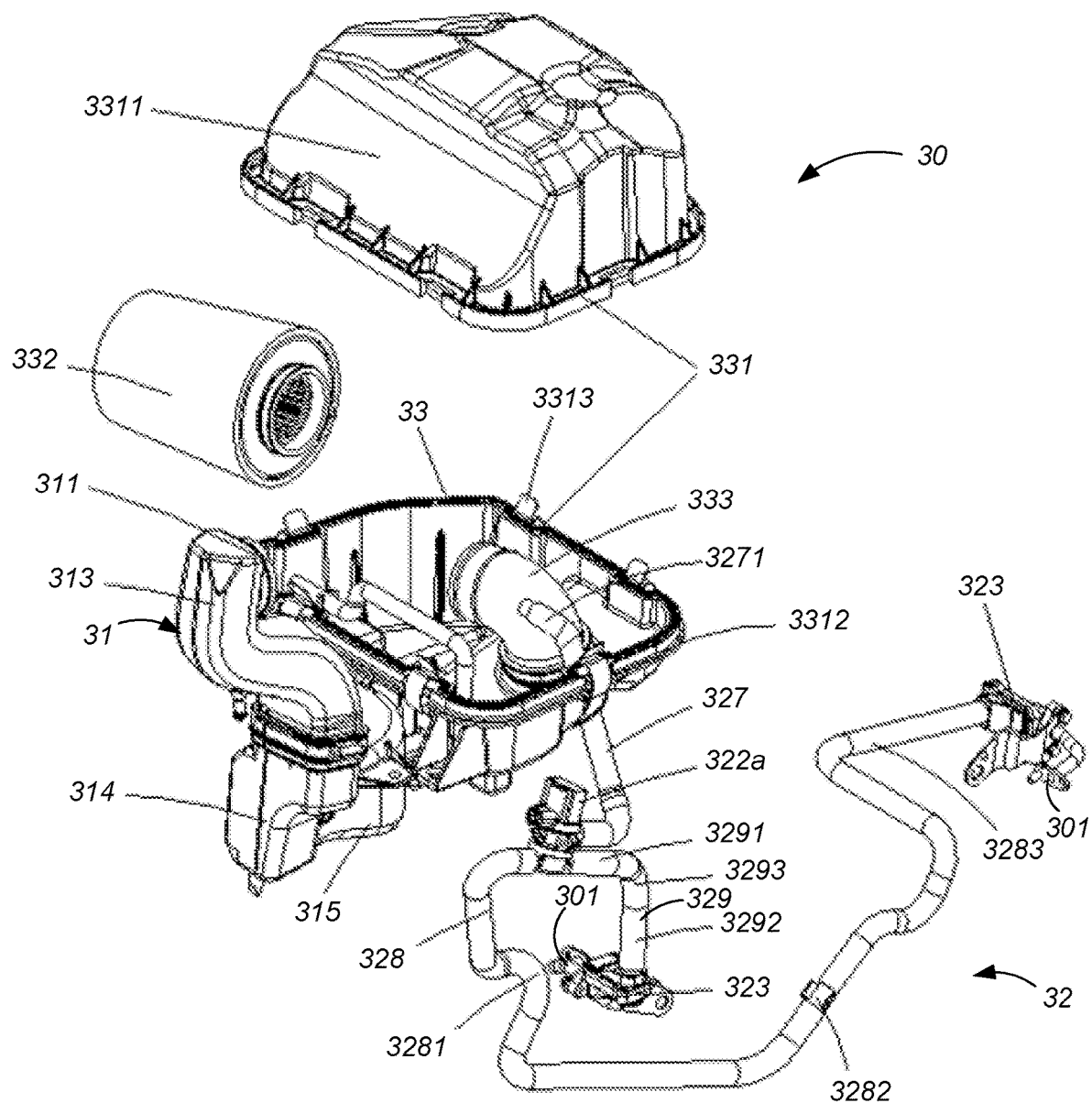
FIG. 19 is an exploded perspective view of an alternative air intake system, similar to FIG. 12 but omitting the supplementary air filter.
Figure 20:
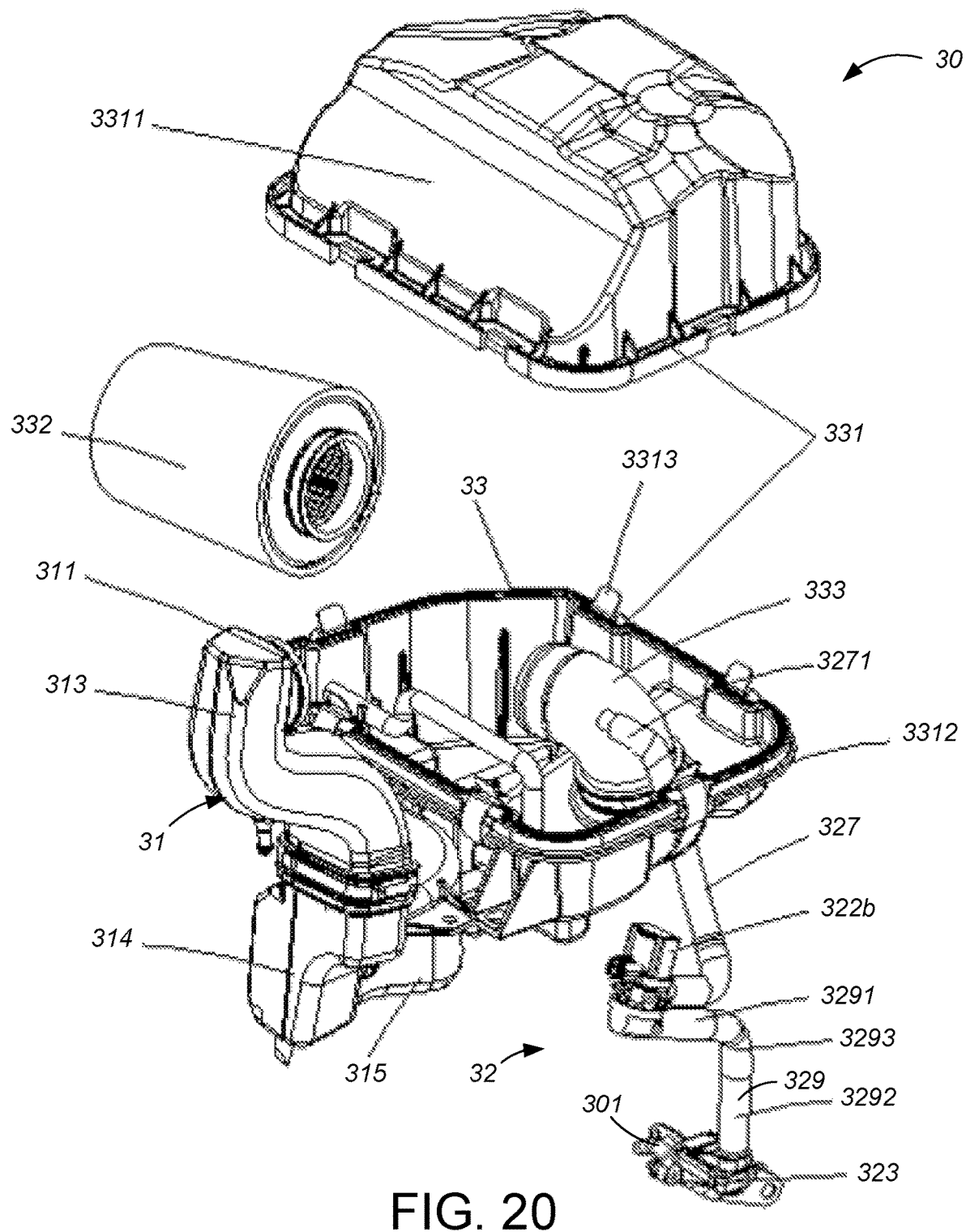
FIG. 20 is an exploded perspective view of an alternative air intake system, similar to FIG. 19 but corresponding to a single-cylinder engine.
Figure 21:
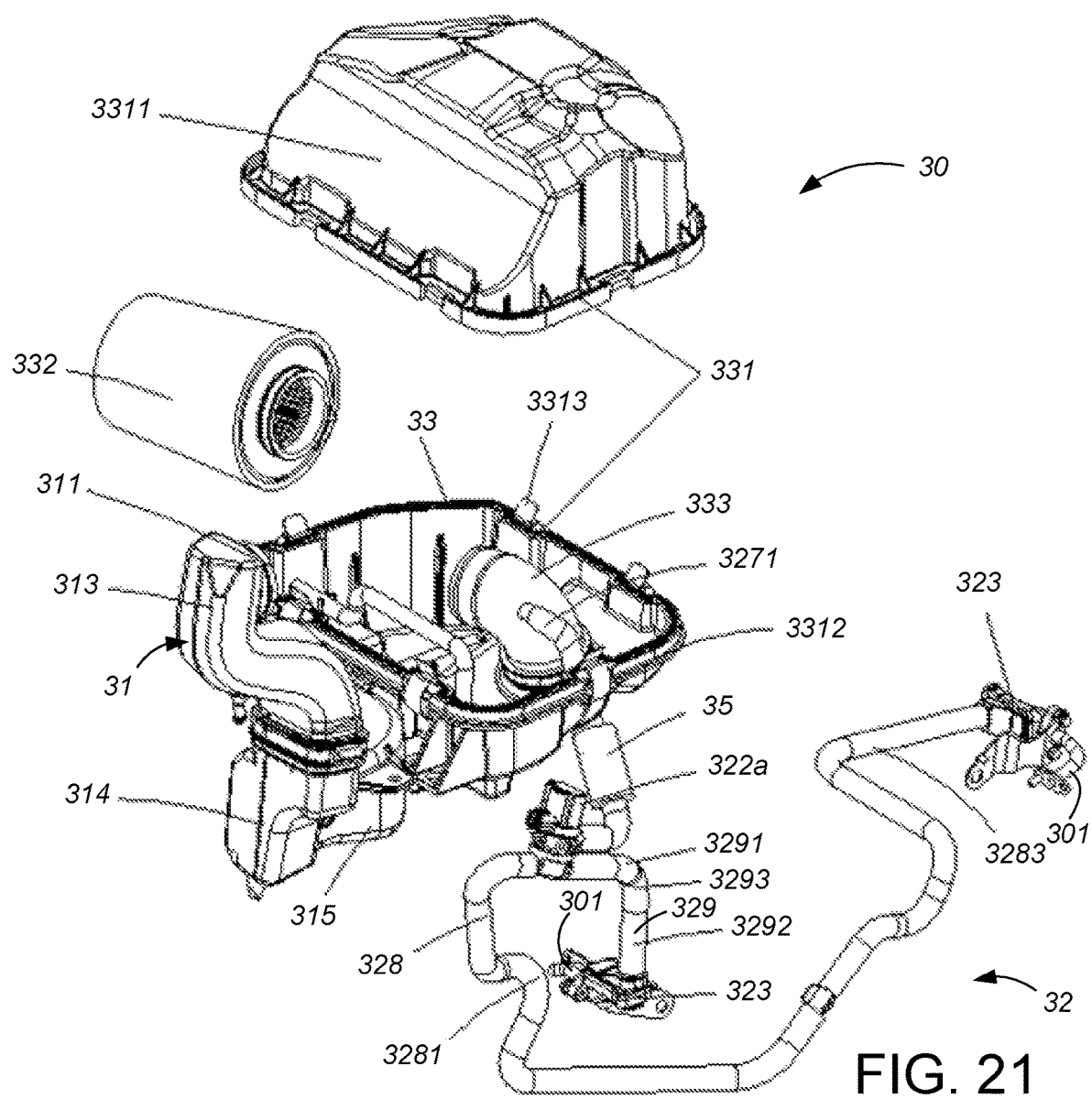
FIG. 21 is an exploded perspective view of an alternative air intake system, similar to FIG. 19 but adding an air pump.
Figure 22:
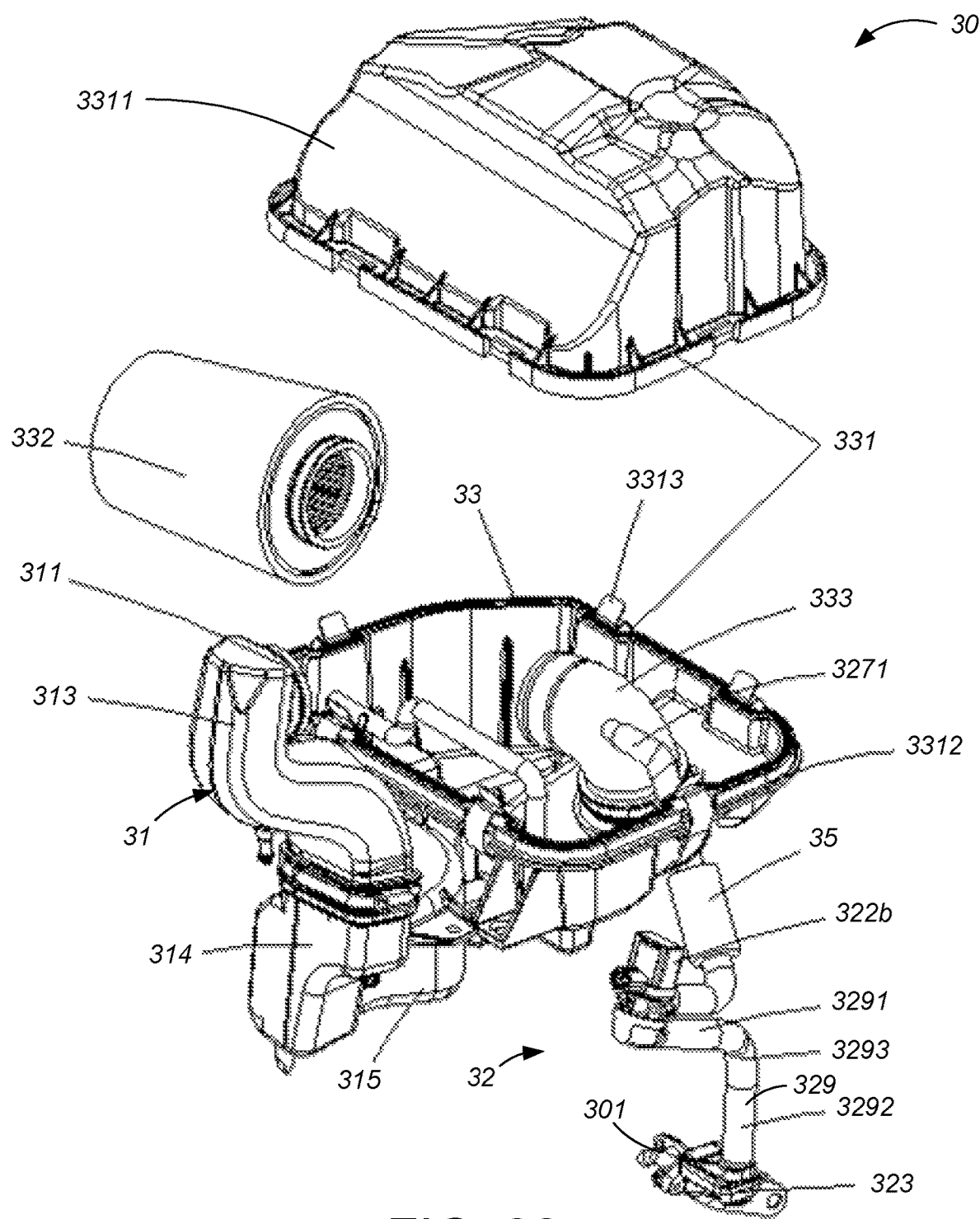
FIG. 22 is an exploded perspective view of an alternative air intake system, adding an air pump and corresponding to a single cylinder engine.

The embodiment of FIG. 19 corresponds to the embodiment of FIG. 12, i.e., for a two cylinder engine with no air pump. The embodiment of FIG. 20 corresponds to the embodiment of FIG. 16, i.e., for a one cylinder engine with no air pump. The embodiment of FIG. 21 corresponds to the embodiment of FIG. 17, i.e., for a two cylinder engine with air pump 35. The embodiment of FIG. 22 corresponds to the embodiment of FIG. 18, i.e., for a one cylinder engine with air pump 35.

Figure 23:
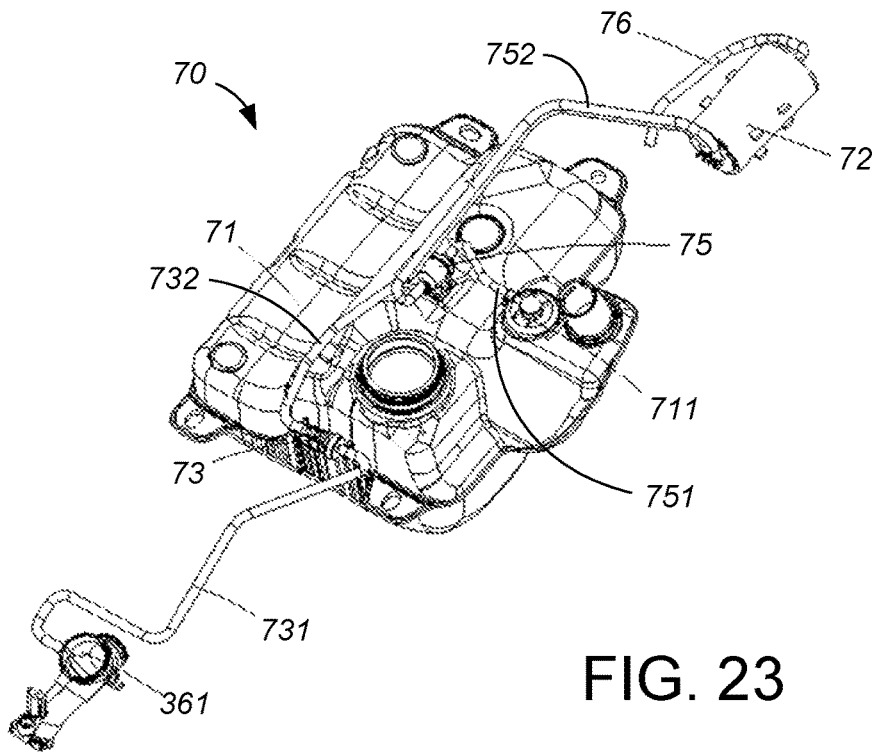
FIG. 23 is a perspective view of a portion of the fuel supply system used in the vehicle of FIG. 1.
Figure 24:
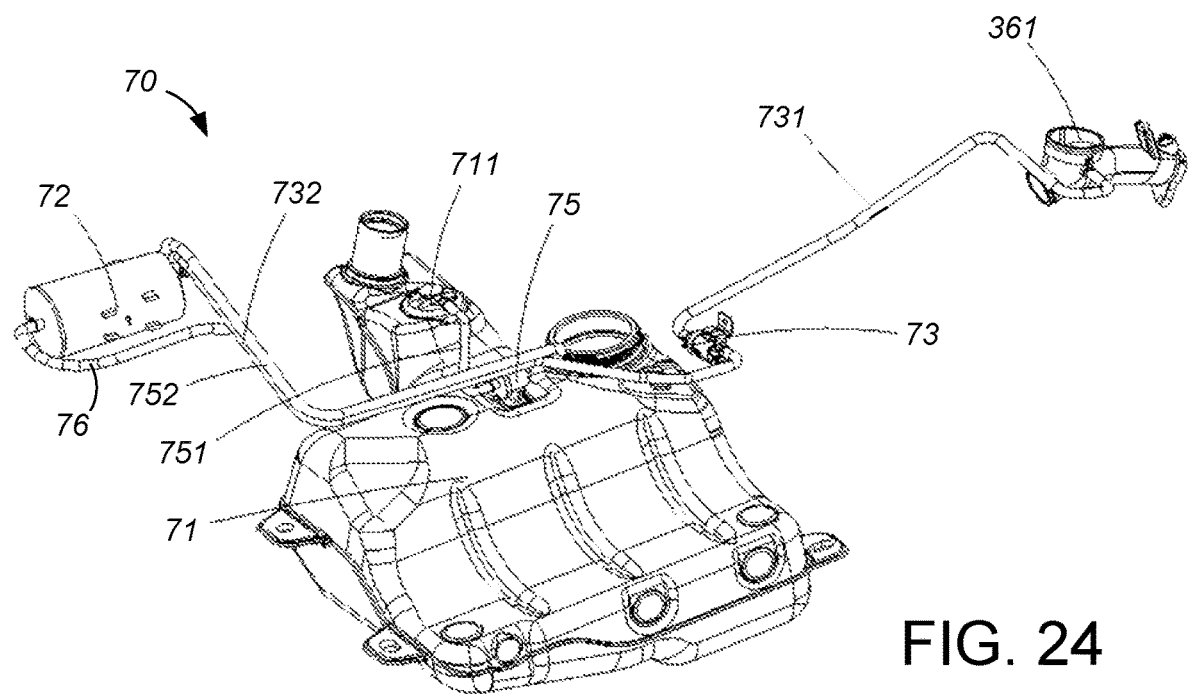
FIG. 24 is another perspective view of the fuel supply system portion of FIG. 23.

FIGS. 23 and 24 show the evaporative emission control system (EVAP) used in a preferred fuel supply system 70 on the off-road vehicle 10. The fuel supply system 70 includes a fuel tank 71 for storing fuel, which is generally fed into the cylinder(s) via a separate fuel line (not shown), fuel pump (not shown) and fuel injector(s) 37. The fuel tank 71 is arranged at the front upper portion of the frame 12. In other embodiments, the fuel tank is located lower to reduce the center of gravity of the off-road vehicle, such as under part of the driver's seat 83 or under the passenger's seat 84 or nearby to under one or both of the seats 83, 84.

The EVAP is designed to prevent gasoline vapor from escaping into the atmosphere, particularly while the engine 20 is stopped. The EVAP includes a volatilization interface 711 mounted on the top of the fuel tank 71 and a carbon canister 72 separately mounted on the frame 12. Fuel volatilized in the fuel tank 71 (primarily while the engine is not running) enters a first volatile pipe 751 through the volatilization interface 711, then enters a second volatile pipe 752 through a two-way valve 75, and then enters the carbon canister 72, and is adsorbed and stored in the carbon canister 72. The first volatile pipe 751 and the second volatile pipe 752 are preferably arranged along the outer wall of the fuel tank 71.

Figure 25:
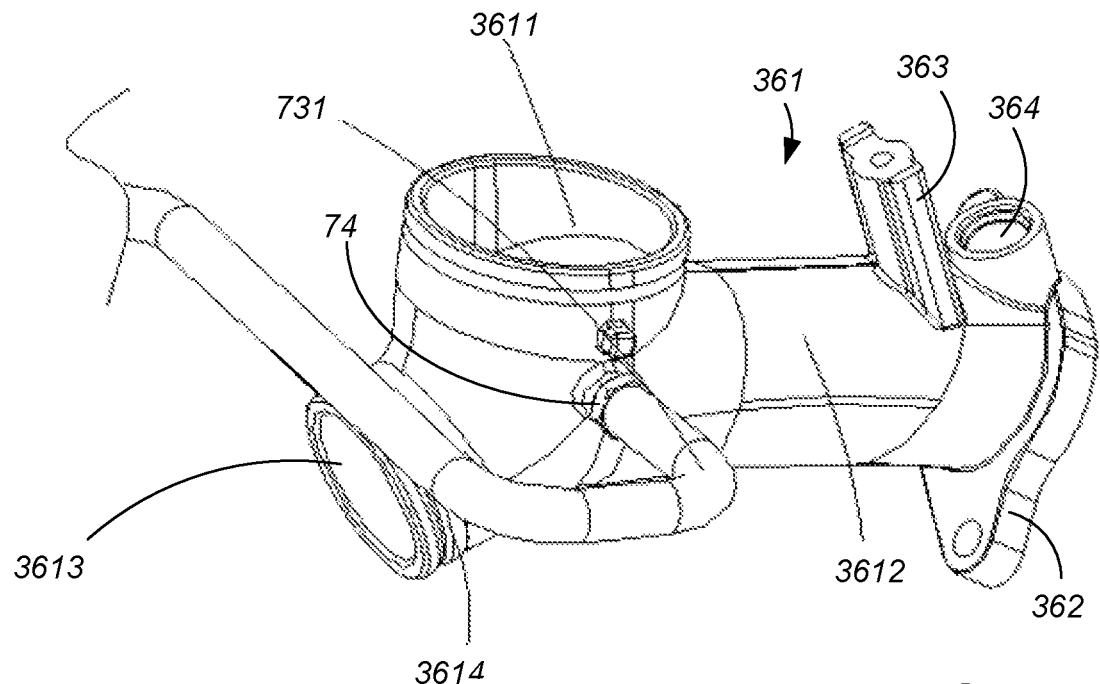
FIG. 25 is a perspective view of the connection between a primary portion of the main intake manifold and pipeline from the carbon canister control valve in the fuel supply system of FIGS. 23 and 24.
Figure 26:
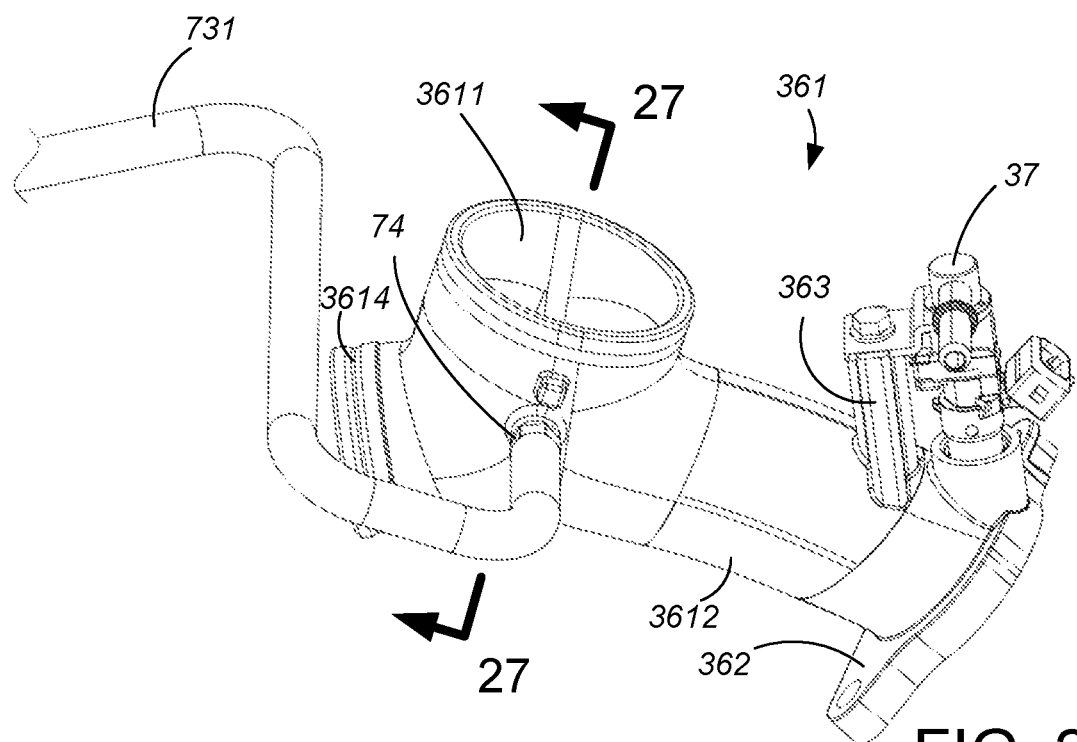
FIG. 26 is a perspective view similar to FIG. 25, but also showing the fuel injector.
Figure 27:
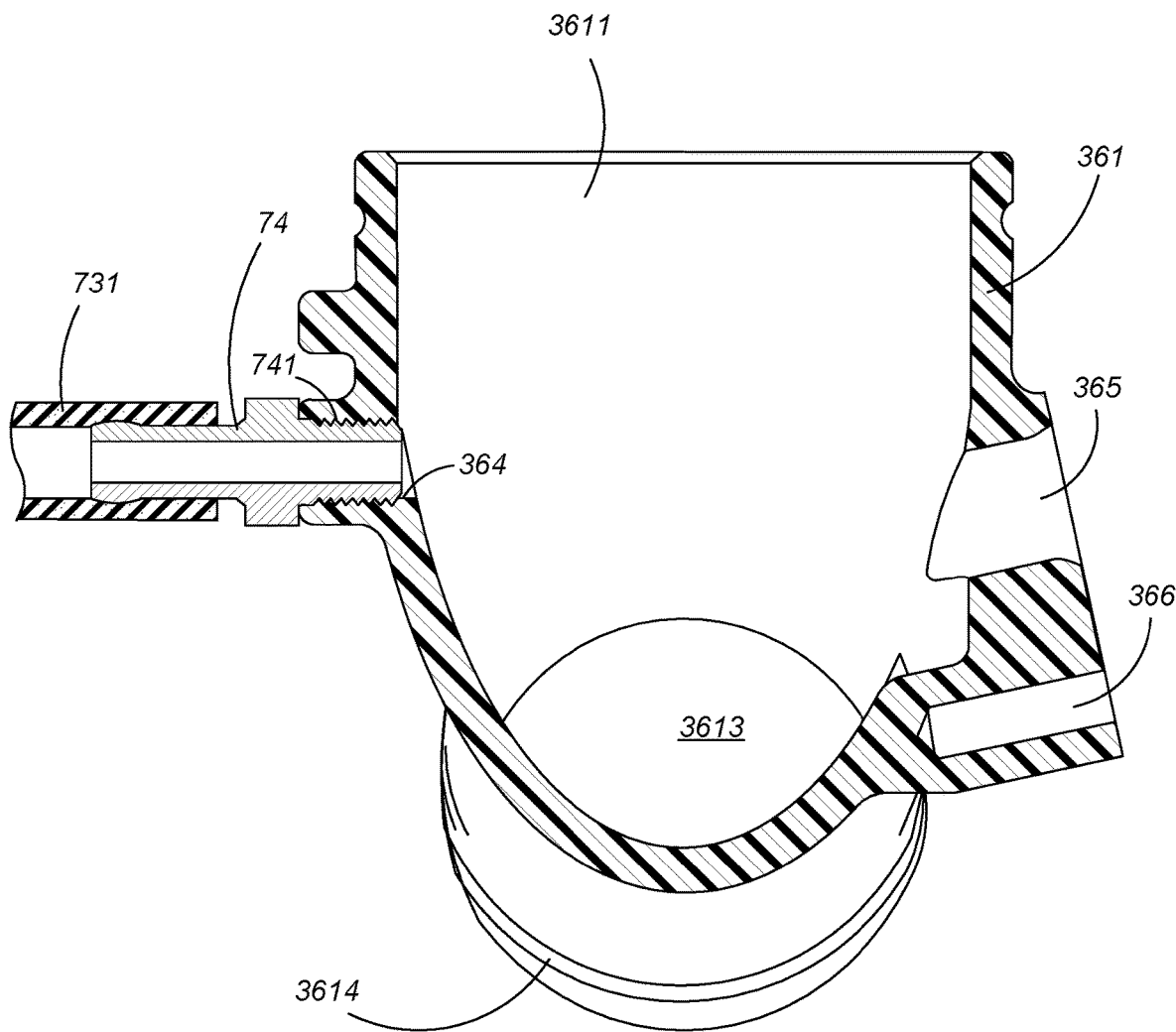
FIG. 27 is a cross-sectional view of the portion of the main intake manifold shown in FIGS. 23-26, taken along cut line 27-27 in FIG. 26.
Figure 30:
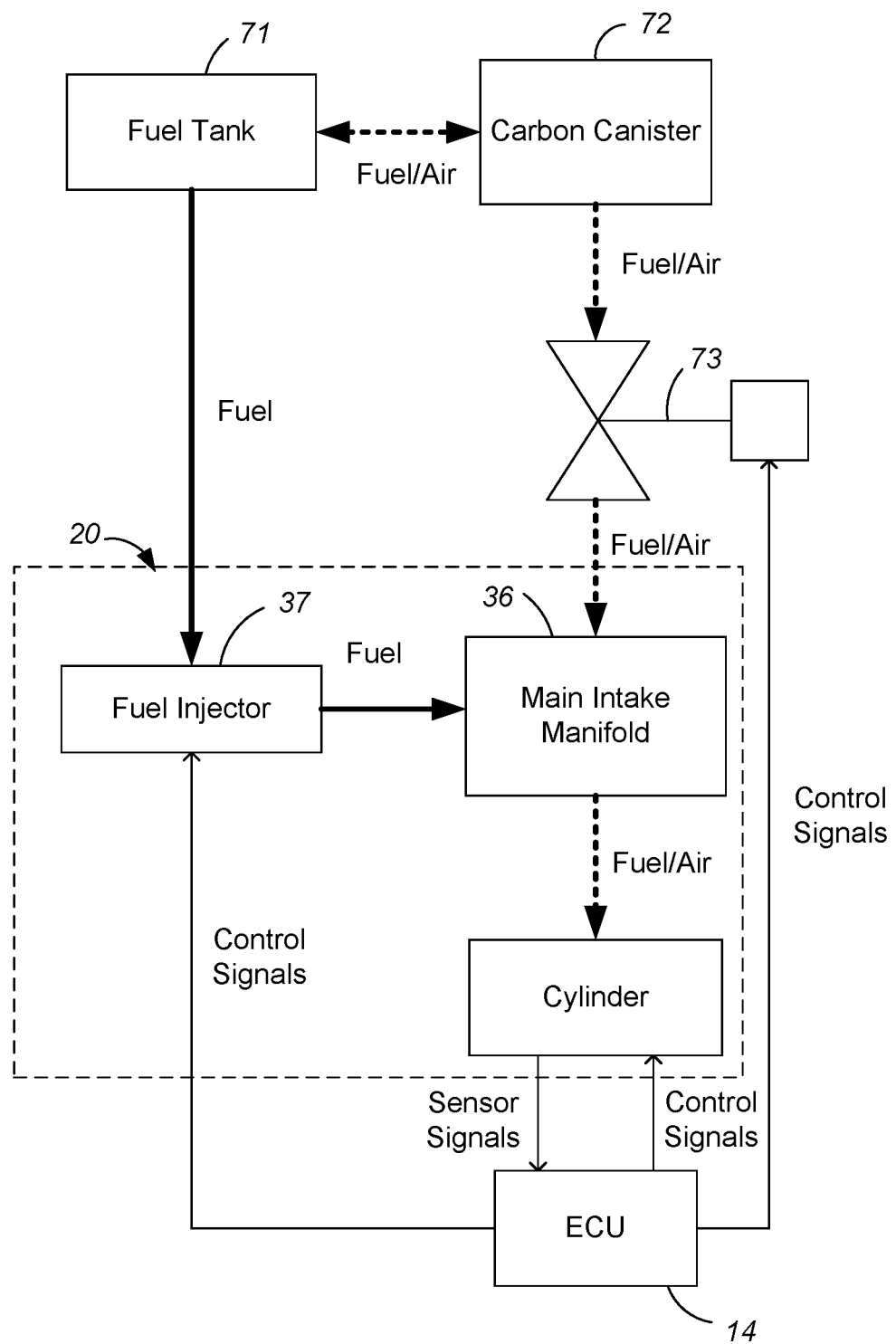
FIG. 30 is a schematic diagram of the preferred control of the fuel system of FIGS. 23 and 24.

A carbon canister control valve 73 has its inlet end connected to carbon canister 72 through carbon canister pipe 732 and has its outlet connected to the main air intake manifold 36 through pipeline 731. FIGS. 25-27 better show a first preferred connection between the pipeline 731 and a primary tube 361 of the main intake manifold 36. In this embodiment, the primary tube 361 of the main intake manifold 36 includes a top inlet opening 3611 which connects such as with a hose clamp (not shown in FIGS. 25 and 26)) to the filter element support tube 333 of the engine air filter 33. One horizontally-extending branch 3612 of the primary tube 361 includes a manifold flange 362 which connects directly to one of the cylinder heads 22, providing one outlet of the main intake manifold 36. The horizontally-extending branch 3612 of the primary tube 361 also includes a mount 363 and an opening 364 for a fuel injector 37. The primary tube 361 has a second outlet opening 3613 and circumferential ridges or grooves 3614 allowing hose clamping to seal to a manifold extension tube (not shown in FIGS. 25 and 26) which connects between the primary tube 361 and the other cylinder head 22. The manifold extension tube may have a similar mount and opening for a fuel injector 37 for the other cylinder, or the fuel injector 37 for the other cylinder may be separately mounted. The pipeline 731 preferably connects to the main intake manifold 36 at a center of the primary tube 361 where the air flow splits to go to both cylinders, so fuel from the carbon canister 72 can be transferred into both cylinders. The main intake manifold 36 could be formed of aluminum or cast iron, but more preferably is molded of one or more pieces of a composite plastic that can withstand the heat when contacting the cylinder head 22. A pipe connector 74 is added which connects in to the interior of the primary tube 361 of the main intake manifold 36, such as by having threads 741 and screwing into a threaded opening 364 of the primary tube 361. As shown in FIG. 30, the primary tube 361 may also have one or more openings 365 and a mount 366 such as for a sensor (not shown).

In addition to pipelines 732 and 752, the carbon canister 72 is also connected to an air intake pipe 76 shown in FIGS. 23 and 24. Air through the air intake pipe 76 flows into an inner cavity of the carbon canister 72. At a time when the engine is running, the carbon canister control valve 73 is opened. Under the vacuum pressure of the main air intake manifold 36, air enters the carbon canister 72 through the air intake pipe 76 and resorbs the fuel in the carbon canister 72 to form a mixture of fuel and air, which mixture is delivered to the main air intake manifold 36 through pipelines 732 and 731. Thus, under control of the two-way valve 75 and the carbon canister control valve 73, fuel that has volatilized out of the fuel tank 71 at one time enters the engine combustion chamber at a later time. The EVAP system not only reduces emissions, but also reduces fuel consumption.

When the fuel tank 71 undergoes negative pressure due to environmental cooling, outside air can also enter the fuel tank 71 through the air intake pipe 76, the carbon canister 72 and the two-way valve 75, to maintain the internal pressure of the fuel tank 71 constant.

In other embodiments, the carbon canister 72 and the carbon canister control valve 73 can be integrated into one unit (not shown). In other embodiments, the two way valve 75 and the carbon canister 72 can be integrated into one unit (not shown). In other embodiments, the two way valve 75 and the volatilization interface 711 can be integrated into one unit (not shown).

Figure 28:
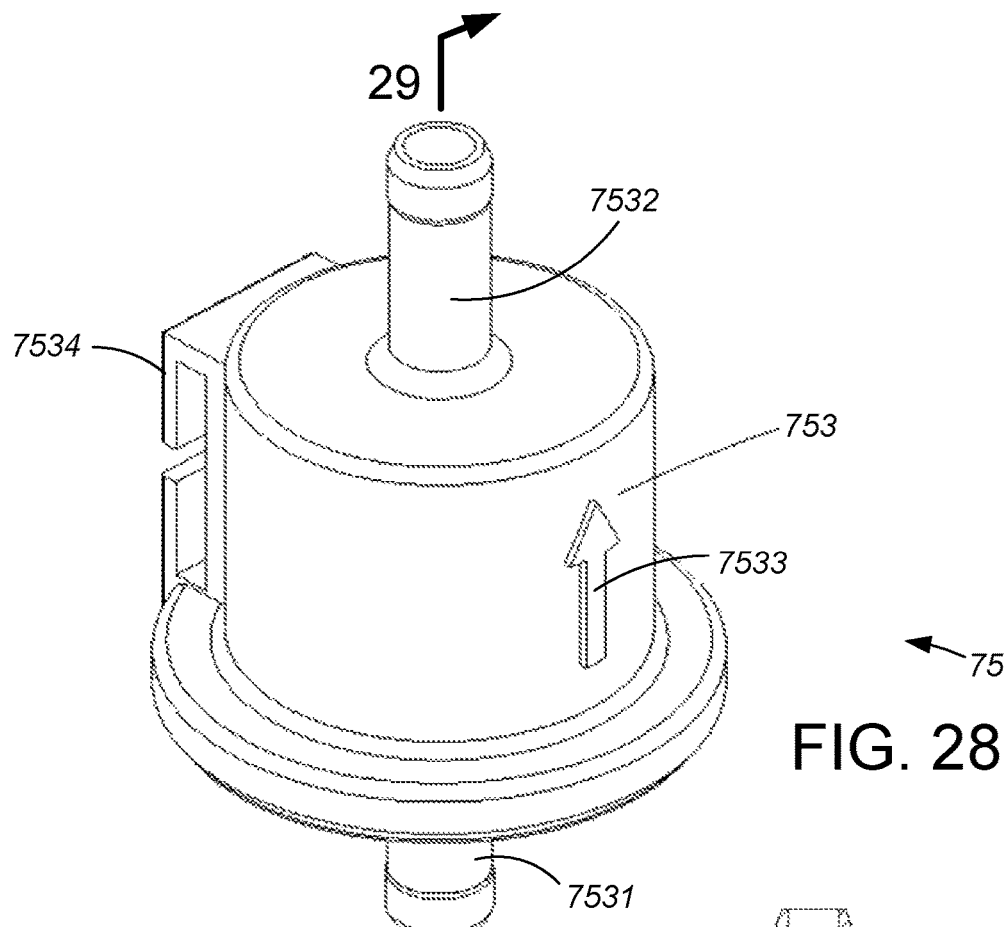
FIG. 28 is a perspective view of the two-way valve used in the fuel supply system of FIGS. 23 and 24.
Figure 29:
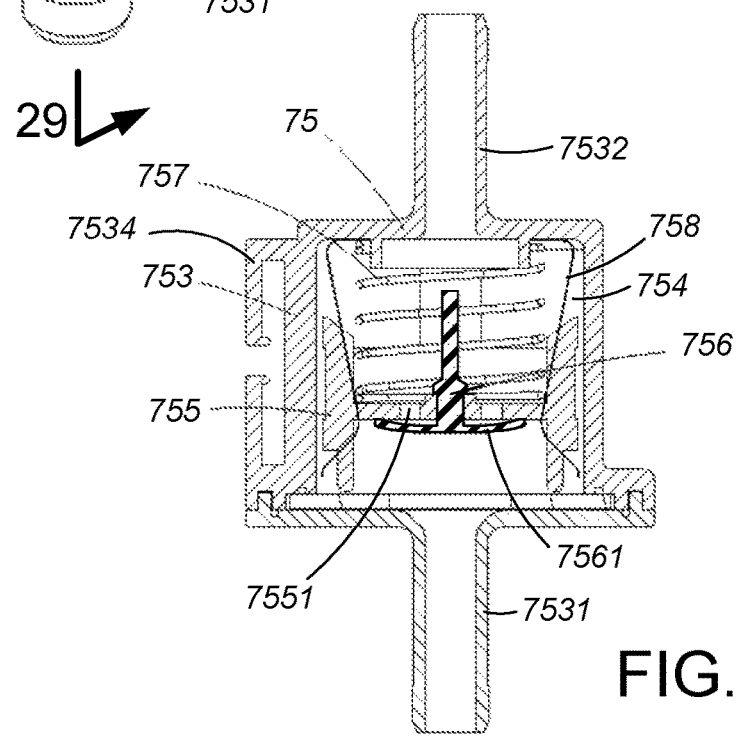
FIG. 29 is a cross-sectional sectional view of the two-way valve of FIGS. 23, 24 and 28 taken along cut line 29-29 in FIG. 28, shown in an open position permitting volatilized fuel to flow from the fuel tank through the valve to the carbon canister.

FIGS. 28 and 29 better show the preferred two-way valve 75. The two-way valve 75 includes a valve body 753 defining a passageway 754 between a first, primarily inlet end 7531 and a second primarily outlet end 7532. An arrow 7533 is embossed on the outside of the valve body 753 indicating the primary direction of flow. A mounting structure 7534 on the outside of the valve body 753 is used to support the two-way valve 75 relative to the frame 12 and/or the fuel tank 71.

A valve element 755 is arranged in the passageway 754, with a valve seat 756 on the valve element 755. A compression spring 757 biases the valve element 755 toward the first end 7531, downwardly in the orientation shown in FIGS. 28 and 29. A flexible centering wire 758 holds the valve element 755 axially centered within the valve body 753. When there is no flow (not shown) through the two-way valve 75, the compression spring 757 pushes the valve element 755 downwardly into sealing engagement against the valve body 753, closing the valve 75.

When the internal pressure of the fuel tank 71 is sufficiently higher than the external air pressure (such as when the sun and/or other environment conditions heat the fuel tank 71) so as to overcome the spring force, volatilized fuel and air in the top of the fuel tank 71 will push the valve element 755 away from the first end 7531 and into the position shown in FIG. 29. The valve element 755 will no longer contact the valve body 753, and the volatilized fuel and air from in the fuel tank 71 will flow around the valve element 755 and out of the second end 7532 toward the carbon canister 72.

The valve element 755 includes a plurality of through-holes 7551 exposing an inside face of a flexible diaphragm 7561 of the valve seat 756. When the internal pressure of the fuel tank 71 is sufficiently lower than the external air pressure (such as after environmental cooling overnight), air (and any residual volatilized fuel) will flow through the air intake pipe 76 and the carbon canister 72 and will push the flexible diaphragm 7561 downwardly out of sealing contact (not shown) with the valve element 755. This air flow, opposite the primary direction shown by arrow 7533, will then move out through the first end 7531 and into the fuel tank 71, maintaining air pressure in the fuel tank 71.

The carbon canister control valve 73 is preferably controlled by a desorption controller, which is preferably part of the controller 14, but alternatively could be a dedicated desorption controller. When the engine is started cold, the amount of fuel/air mixture from the carbon canister 72 entering the combustion chamber is controlled by the desorption controller 14 and the control valve 73 to reduce the exhaust emissions. The amount of fuel through the fuel injector(s) 37 is separately and precisely controlled by the ECU 14 based on combustion conditions for performance response of the engine 20. FIG. 30 depicts this general control strategy.

Figure 31:
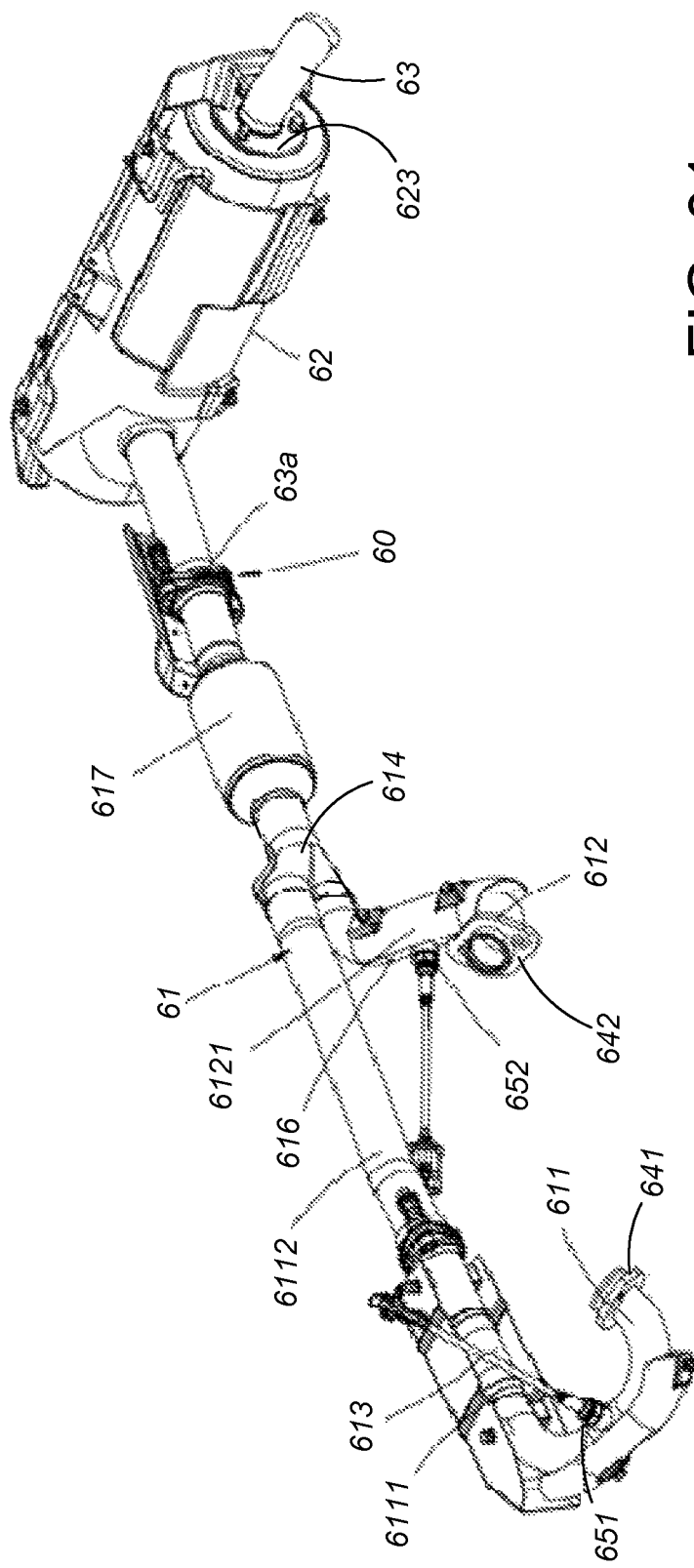
FIG. 31 is a perspective view of the preferred exhaust system in the off-road vehicle of FIG. 1.
Figure 32:
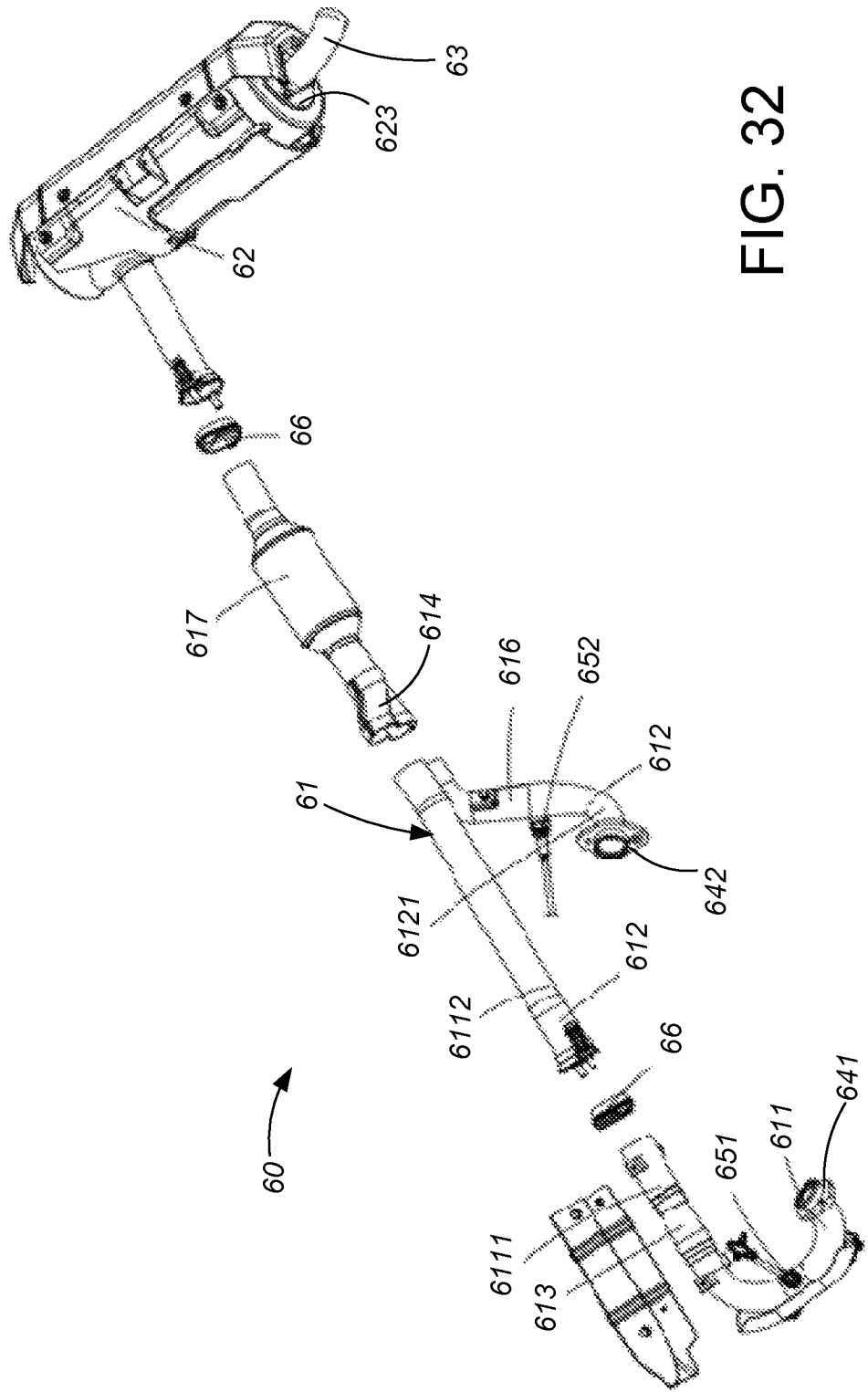
FIG. 32 is an exploded view of the exhaust system of FIG. 31.

FIGS. 31 and 32 show the preferred exhaust system 60 for the dual-cylinder engine 20 of the off-road vehicle 10. The exhaust system 60 includes an exhaust conduit 61 leading to a muffler 62, outputting exhaust gasses through a tailpipe 63. The exhaust gas from combustion enters the muffler 62 through the exhaust conduit 61, and then discharges into the environment through the tailpipe 63. The exhaust conduit 61 includes a front cylinder exhaust conduit 611 and a rear cylinder exhaust conduit 612 both leading to and combining with each other in a merge section 614. The front cylinder exhaust conduit 611 includes a front elbow section 6111 with a front cylinder head attachment flange 641 and connecting to a front straight pipe section 6112. The rear cylinder exhaust conduit 612 includes at least a rear elbow section 6121 with a rear cylinder head attachment flange 642. The exhaust conduit 61 is preferably provided with two first-stage catalytic converters 613, 616 (each in an elbow section 6111, 6121) upstream of the merge section 614 and at least one second-stage catalytic converter 617 downstream of the merge section 614. The catalytic converters 613, 616, 617 conduct more than one catalytic oxidation reaction on the exhaust gas to reduce components to beneath the exhaust emission limit.

In the preferred embodiments, the distance between the inlet of the front first-stage catalytic converter 613 and the front cylinder head attachment flange 641 is less than 600 mm. The distance from the rear first-stage catalytic converter 616 to the rear cylinder head attachment flange 642 is 200-600 mm.

The exhaust conduit 61 is preferable equipped with a front oxygen sensor 651 and a rear oxygen sensor 652. The front oxygen sensor 651 is located on the front elbow section 6111 upstream of the front first-stage catalytic converter 613, so the exhaust gas goes through the front oxygen sensor 651, and then through the front first-stage catalytic converter 613. The distance from the front cylinder head attachment flange 641 to the front oxygen sensor 651 is preferably in the range from 150 mm to 250 mm, and more preferably in the range from 150 mm to 200 mm. The rear oxygen sensor 652 is located on the rear elbow section 6121 upstream of the rear first-stage catalytic converter 616, so the exhaust gas goes through the rear oxygen sensor 652, and then through the rear first-stage catalytic converter 616. The distance from the rear cylinder head attachment flange 642 to the rear oxygen sensor 652 is preferably in the range from 150 mm to 250 mm, and more preferably in the range from 150 mm to 200 mm.

Figure 33:
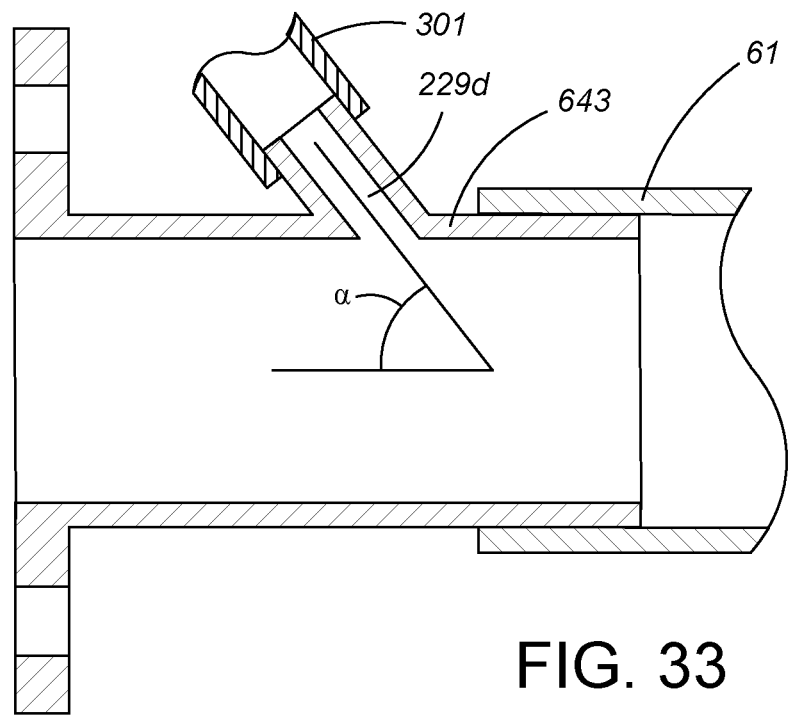
FIG. 33 is a cross-sectional view of a first alternative cylinder head attachment flange with a supplementary air supply passage, which could be used in the exhaust system instead of locating the supplementary air supply passage in the cylinder head, in which the vector angle between a flow direction of supplementary air flowing into the flange and a flow direction of the exhaust stream is less than 90°.
Figure 34:
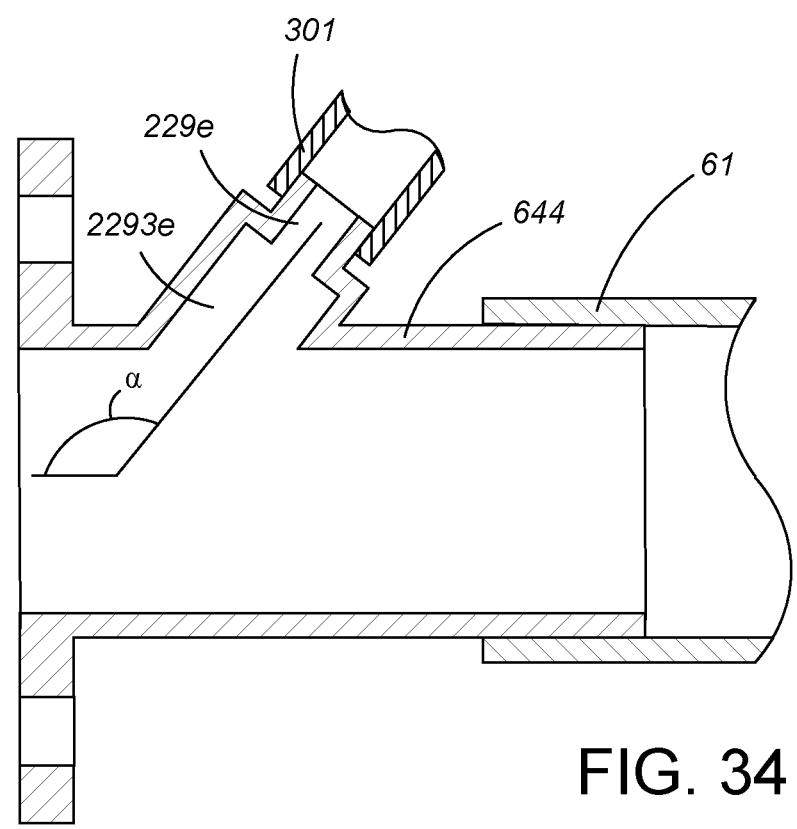
FIG. 34 is a cross-sectional view of a first alternative cylinder head attachment flange with a supplementary air supply passage, which could be used in the exhaust system instead of locating the supplementary air supply passage in the cylinder head, in which the vector angle between a flow direction of supplementary air flowing into the flange and a flow direction of the exhaust stream is greater than 90°.

FIGS. 33 and 34 show two alternative cylinder head attachment flanges 643, 644 to replace the front cylinder head attachment flange 641 and/or rear cylinder head attachment flange 642 and to omit the supplementary air supply passages 229a, 229b, 229c of FIGS. 5-11 from within the cylinder head 22. In FIG. 33, a supplementary air supply passage 229d extends within the cylinder head attachment flange 643 with an acute vector angle α (similar to supplementary air supply passage 229c of FIG. 11), and no air flow buffer zone is included. In FIG. 34, supplementary air supply passage 229e extends within the cylinder head attachment flange 644 with an obtuse vector angle α (similar to supplementary air supply passage 229a of FIGS. 5-9), and an air flow buffer zone 2293e is included. In either embodiment, fresh air enters the cylinder head attachment flange 643, 644 of the exhaust system 60 through the supplementary air supply pipe 301, and is mixed with the exhaust gas in the exhaust conduit 61 to oxidize the exhaust gas upstream of both the respective oxygen sensor 651/652 and upstream of the respective first stage catalytic converter 613/616. Other embodiments place the supplementary air supply passage in either or both of the elbow sections 6111, 6121 upstream of both the respective oxygen sensor 651/652 and upstream of the respective first stage catalytic converter 613, 616. In all these embodiments, the further oxidation of the exhaust gas from combustion reduces the exhaust emissions value of CO to below 700 mg/km, the exhaust emissions value of non-methane hydrocarbons ("NMHC") to below 47.6 mg/km, and the exhaust emissions value of THC to below 70 mg/km.

Figure 35:
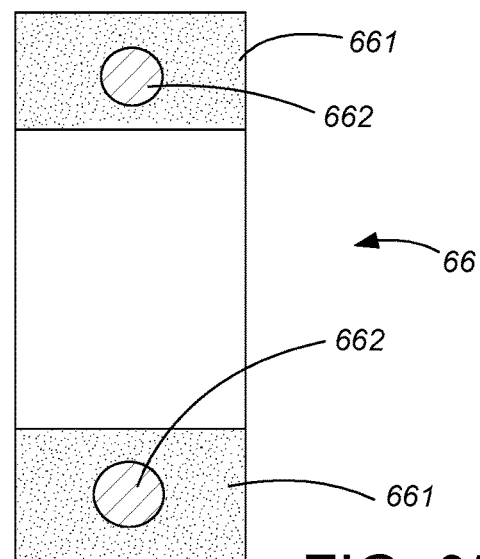
FIG. 35 is a cross-sectional view of the graphite seal sleeve used in the exhaust system of FIGS. 31 and 32.

As shown in FIGS. 31 and 32, at least some of the connections in the exhaust conduit 61 are sealed with a graphite sealing sleeve 66. A cross-sectional view of the graphite sealing sleeve 66 is shown in FIG. 35. The graphite sealing sleeve 66 includes a graphite layer 661 and copper wires 662, wherein the graphite layer 661 is coated on the copper wires 662. The graphite layer 661 provides lubricity to allow for thermal expansion and contraction at the joint of the exhaust conduit 61, while the copper wires 662 provide hoop strength and support to the graphite layer 661 to maintain a tight seal.

In the preferred embodiments, the air pressure inside the exhaust system and/or the intake system is within the range of +−10 to 100 kPa of atmospheric pressure. The leakage rate out of the exhaust system or into the intake system is less than 5 L/min. At a pressure differential between atmospheric and the exhaust system or intake system within the range of 10 to 100 kPa, a leakage flow rate less than 5 L/min is considered a qualified product.

Specifically, the leakage rate is tested by blocking all air outlets from the exhaust system or air intake system or other components to be tested, and then continuously supplying air to the intake pipe to keep the internal pressure constant to a predetermined pressure within the range of 10 to 100 kPa over ambient, and measuring the air flow rate in. The air tightness consistency of the exhaust system and the intake system may also be tested in other ways, for example, by blocking all the air outlets of the exhaust system or the intake system or other parts to be tested, and then adding a certain pressure until the air pressure in the air intake pipe is stable, and then check the air pressure value in the air intake pipe after a period of time.

The leakage of the intake and exhaust conduits of a single off-road vehicle at different times shall be measured, and the leakage of all off-road vehicles in a batch of products shall be consistent, thereby reducing the rate of unqualified products that fail to meet the emission limit due to the inconsistent leakage of inlet and exhaust passages.

Figure 36:
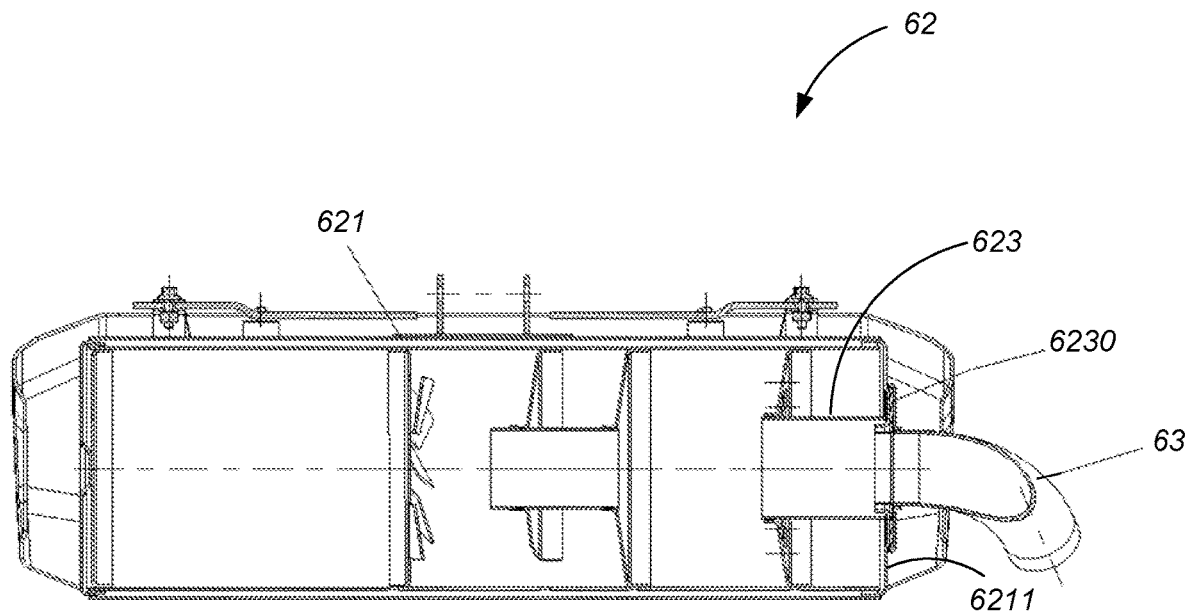
FIG. 36 is a cross-sectional view of the muffler used in the exhaust system of FIGS. 31 and 32.
Figure 37:
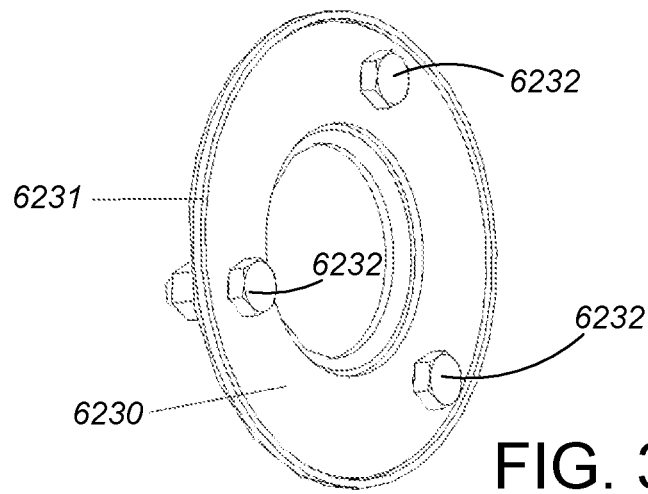
FIG. 37 is a perspective view of the spark collector end plate in the muffler of FIG. 36.

FIG. 36 shows a cross-sectional view through the preferred muffler 62. The preferred muffler 62 includes a muffler tube 621 and a spark collector 623 before terminating in the tailpipe 63. FIG. 37 better shows the end plate 6230 of the spark collector 623. A rib 6231 is arranged on the end plate 6230 of the spark collector 623. The end plate 6230 is connected to the end wall 6211 of the muffler tube 621 using bolts 6232. The rib 6231 allows for a tighter seal, and less leakage of hot carbon particles collected by the spark collector 623.

Figure 38:
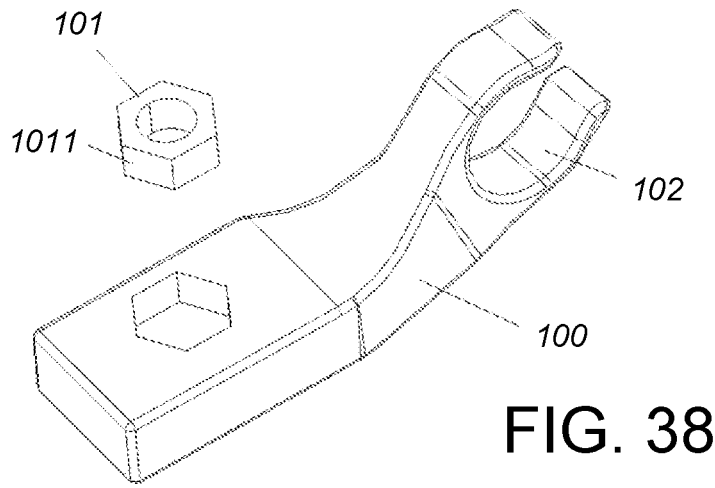
FIG. 38 is a perspective view of a pipe bracket which can be used to support any of the pipelines in the vehicle of FIG. 1.

FIG. 38 shows a pipe bracket 100 which can be used for mounting any of the pipelines discussed above. The pipe bracket 100 is provided with a bushing 101 having an outer wall 1011 with a stop plane. The cross-section of the bushing 101 is hexagonal. A pipe clamp 102 is arranged on the end of the pipe bracket 100, and the pipeline can be held by the pipe clamp 102.

Figure 39:
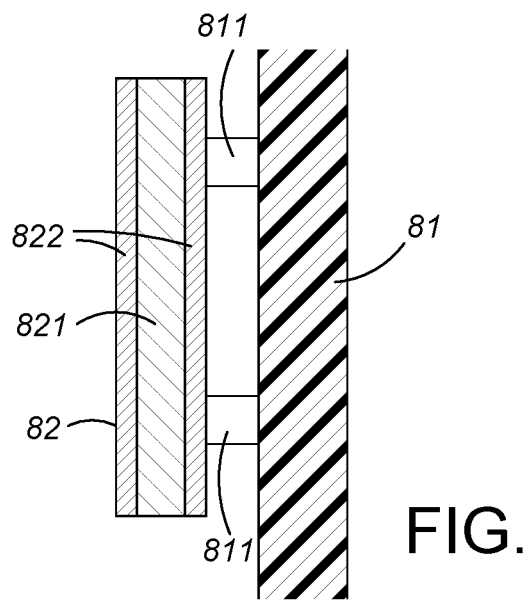
FIG. 39 is a cross-sectional view of a portion of the vehicle cover used in the vehicle of FIG. 1, taken at cut line 39-39 in FIG. 1.

FIG. 39 shows a cross-sectional view through a portion of the vehicle cover 80, specifically the portion of the vehicle cover underneath the driver's seat 83 and between the driver's legs. At this location, the body cover 80 includes a vehicle cover plate layer 81 such as formed of plastic and on the outside toward the driver's legs, and a heat shield 82. The plastic cover plate layer 81 is provided with a plurality of mounting columns 811. The heat shield 82 is connected to the mounting columns 811 by bolts, thereby spacing the heat shield 82 from the cover plate layer 81 by an air gap. The heat shield 82 is preferably formed with two aluminum foil layers 822 and a ceramic layer 821 connected between the two aluminum foil layers 822. This construction of the body cover 80 is quite effective at shielding the heat of the engine 20 and exhaust system 60 away from the driver.

It should be understood that any appropriate changes or modifications can be made to the embodiments described herein and remain within the scope of this application and claims. The embodiments discussed are only examples of the features required by the claims. General technical personnel in the art can make changes to the example embodiments, and such changes are also considered to be within the scope of this application and the scope of independent claims and subsidiary claims.

What is claimed is:

1. An off-road vehicle comprising:
   a frame;
   a pair of front wheels;
   a pair of rear wheels;
   a controller;
   a suspension system, comprising a front suspension and a rear suspension, the front wheels being connected to the frame by the front suspension, and the rear wheels being connected to the frame by the rear suspension;
   an engine supported on the frame, at least one of the front or rear wheels being rotationally driven by the engine, the engine being equipped with a combustion chamber, the engine comprising a cylinder block and a cylinder head connected to the cylinder block, the cylinder head being equipped with air intake passage and an exhaust passage;
   a fuel supply system for supplying fuel to the engine;
   an exhaust system comprising an exhaust conduit and a muffler communicating with the exhaust conduit, the exhaust conduit communicating with the exhaust passage in the cylinder head;
   an intake system through which air is fed into the air intake passage; and
   a supplementary air supply passage for mixing air into the exhaust gas discharged from the combustion chamber, wherein air flow through the supplementary air supply passage is electronically controlled by the controller controlling a valve and/or an air pump.

2. The off-road vehicle of claim 1, wherein an angle between a center line of the supplementary air supply passage and a center line of the exhaust passage is less than 90°.

3. The off-road vehicle of claim 1, wherein the cylinder head comprises a supplementary air supply passage seat extending perpendicular to a center line of the supplementary air supply passage, and the supplementary air supply passage is defined in the cylinder head.

4. The off-road vehicle of claim 1, further comprising a supplementary air filter filtering air provided to the supplementary air supply passage, wherein the supplementary air filter comprises an air filter housing and a filter paper arranged in the air filter housing.

5. The off-road vehicle of claim 4, wherein the valve and/or air pump is an on-off valve controlling air flow through the supplementary air supply passage, wherein the controller provides an electronic signal which opens the on-off valve when the engine is cold and closes the on-off valve when the engine reaches a preset temperature.

6. The off-road vehicle of claim 5, further comprising a one-way valve downstream of the on-off valve and upstream of the supplementary air supply passage.

7. The off-road vehicle of claim 5, wherein the engine is a multi-cylinder engine comprising a front cylinder and a rear cylinder, the on-off valve has one outlet for a front supplementary air supply pipe corresponding to the front cylinder of the engine and another outlet for a rear supplementary air supply pipe corresponding to the rear cylinder of the engine.

8. The off-road vehicle of claim 5, wherein the intake system further comprises an engine air filter filtering air fed into the air intake passage.

9. The off-road vehicle of claim 1, further comprising an air pump that pumps air into the supplementary air supply passage.

10. The off-road vehicle of claim 1, wherein the exhaust system comprises at least one first-stage catalytic converter and at least one second-stage catalytic converter downstream of the first-stage catalytic converter.

11. An off-road vehicle comprising:
    a frame;
    a pair of front wheels;
    a pair of rear wheels;
    a controller;
    a suspension system, comprising a front suspension and a rear suspension, the front wheels being connected to the frame by the front suspension, and the rear wheels being connected to the frame by the rear suspension;
    an engine supported on the frame, at least one of the front or rear wheels being rotationally driven by the engine, the engine being equipped with a combustion chamber, the engine comprising a cylinder block and a cylinder head connected to the cylinder block, the cylinder head being equipped with air intake passage and an exhaust passage;
    a fuel supply system for supplying fuel to the engine;
    an exhaust system comprising an exhaust conduit and a muffler communicating with the exhaust conduit, the exhaust conduit communicating with the exhaust passage in the cylinder head;
    an intake system through which air is fed into the air intake passage; and
    a supplementary air supply passage for mixing air into the exhaust gas discharged from the combustion chamber;
    wherein an angle between a center line of the supplementary air supply passage and a center line of the exhaust passage is greater than or equal to 90°, and further comprising an air flow buffer zone in fluid communication between the supplementary air supply passage and the exhaust passage, the air flow buffer zone having a greater cross-sectional area than the supplementary air supply passage.

12. An off-road vehicle comprising:
    a frame;
    a pair of front wheels;
    a pair of rear wheels;
    a controller;
    a suspension system, comprising a front suspension and a rear suspension, the front wheels being connected to the frame by the front suspension, and the rear wheels being connected to the frame by the rear suspension;

an engine supported on the frame, at least one of the front or rear wheels being rotationally driven by the engine, the engine being equipped with a combustion chamber, the engine comprising a cylinder block and a cylinder head connected to the cylinder block, the cylinder head being equipped with air intake passage and an exhaust passage;

a fuel supply system for supplying fuel to the engine;

an exhaust system comprising an exhaust conduit and a muffler communicating with the exhaust conduit, the exhaust conduit communicating with the exhaust passage in the cylinder head;

an intake system through which air is fed into the air intake passage; and a supplementary air supply passage for mixing air into the exhaust gas discharged from the combustion chamber;

wherein the supplementary air supply passage is defined in the cylinder head, and wherein the cylinder head further defines a cooling water passage, a plurality of cavities for mounting valve springs, a lubricating oil chamber and an intake passage, and the supplementary air supply passage is independent of and not in fluid communication with the cooling water passage or the lubricating oil chamber, and wherein a barrier portion of the cylinder head is arranged between the cooling water passage and the supplementary air supply passage.

13. An off-road vehicle comprising:
a frame;
a pair of front wheels;
a pair of rear wheels;
a controller;
a suspension system, comprising a front suspension and a rear suspension, the front wheels being connected to the frame by the front suspension, and the rear wheels being connected to the frame by the rear suspension;
an engine supported on the frame, at least one of the front or rear wheels being rotationally driven by the engine, the engine being equipped with a combustion chamber, the engine comprising a cylinder block and a cylinder head connected to the cylinder block, the cylinder head being equipped with air intake passage and an exhaust passage;
a fuel supply system for supplying fuel to the engine;
an exhaust system comprising an exhaust conduit and a muffler communicating with the exhaust conduit, the exhaust conduit communicating with the exhaust passage in the cylinder head; and
an intake system through which air is fed into the air intake passage; and
a supplementary air supply passage for mixing air into the exhaust gas discharged from the combustion chamber;
wherein the engine is a multi-cylinder engine comprising a front cylinder and a rear cylinder, with a front supplementary air supply pipe corresponding to the front cylinder of the engine and a rear supplementary air supply pipe corresponding to the rear cylinder of the engine, and further comprising at least one throttling plug throttling air flow through the front supplementary air supply pipe or the rear supplementary air supply pipe.

14. An off-road vehicle comprising:
a frame;
a pair of front wheels;
a pair of rear wheels;
a controller;
a suspension system, comprising a front suspension and a rear suspension, the front wheels being connected to the frame by the front suspension, and the rear wheels being connected to the frame by the rear suspension;
an engine supported on the frame, at least one of the front or rear wheels being rotationally driven by the engine, the engine being equipped with a combustion chamber, the engine comprising a cylinder block and a cylinder head connected to the cylinder block, the cylinder head being equipped with air intake passage and an exhaust passage;
a fuel supply system for supplying fuel to the engine;
an exhaust system comprising an exhaust conduit and a muffler communicating with the exhaust conduit, the exhaust conduit communicating with the exhaust passage in the cylinder head; and
an intake system through which air is fed into the air intake passage; and
a supplementary air supply passage for mixing air into the exhaust gas discharged from the combustion chamber;
wherein the engine is a multi-cylinder engine comprising a front cylinder and a rear cylinder, with a front supplementary air supply pipe corresponding to the front cylinder of the engine and a rear supplementary air supply pipe corresponding to the rear cylinder of the engine, wherein internal diameters of the front supplementary air supply pipe and rear supplementary air supply pipe are different.

15. An off-road vehicle comprising:
a frame;
a pair of front wheels;
a pair of rear wheels;
a controller;
a suspension system, comprising a front suspension and a rear suspension, the front wheels being connected to the frame by the front suspension, and the rear wheels being connected to the frame by the rear suspension;
an engine supported on the frame, at least one of the front or rear wheels being rotationally driven by the engine, the engine being equipped with a combustion chamber, the engine comprising a cylinder block and a cylinder head connected to the cylinder block, the cylinder head being equipped with air intake passage and an exhaust passage;
a fuel supply system for supplying fuel to the engine;
an exhaust system comprising an exhaust conduit and a muffler communicating with the exhaust conduit, the exhaust conduit communicating with the exhaust passage in the cylinder head;
an intake system through which air is fed into the air intake passage; and
a supplementary air supply passage for mixing air into the exhaust gas discharged from the combustion chamber;
wherein the engine is a multi-cylinder engine comprising a front cylinder and a rear cylinder, wherein the exhaust conduit comprises a front cylinder exhaust conduit and a rear cylinder exhaust conduit joining the front cylinder exhaust conduit at a merge section, and wherein the exhaust system comprises at least a front first-stage catalytic converter in the front cylinder exhaust conduit, a rear first-stage catalytic converter is the rear cylinder exhaust conduit, and at least one second-stage catalytic converter downstream of the merge section.

16. An off-road vehicle comprising:
a frame;
a pair of front wheels;
a pair of rear wheels;
a controller;
a suspension system, comprising a front suspension and a rear suspension, the front wheels being connected to the frame by the front suspension, and the rear wheels being connected to the frame by the rear suspension;

an engine supported on the frame, at least one of the front or rear wheels being rotationally driven by the engine, the engine being equipped with a combustion chamber, the engine comprising a cylinder block and a cylinder head connected to the cylinder block, the cylinder head being equipped with air intake passage and an exhaust passage;

a fuel supply system for supplying fuel to the engine;

an exhaust system comprising an exhaust conduit and a muffler communicating with the exhaust conduit, the exhaust conduit communicating with the exhaust passage in the cylinder head;

an intake system through which air is fed into the air intake passage; and a supplementary air supply passage for mixing air into the exhaust gas discharged from the combustion chamber;

wherein the exhaust conduit comprises at least one joint sealed by a graphite seal sleeve, and wherein the graphite seal sleeve comprises copper wires and a graphite layer coated on the copper wires.

17. An off-road vehicle comprising:

a frame;

a pair of front wheels;

a pair of rear wheels;

a controller;

a suspension system, comprising a front suspension and a rear suspension, the front wheels being connected to the frame by the front suspension, and the rear wheels being connected to the frame by the rear suspension;

an engine supported on the frame, at least one of the front or rear wheels being rotationally driven by the engine, the engine being equipped with a combustion chamber, the engine comprising a cylinder block and a cylinder head connected to the cylinder block, the cylinder head being equipped with air intake passage and an exhaust passage;

a fuel supply system for supplying fuel to the engine, wherein the fuel supply system comprises:
 a fuel tank;
 a carbon canister connected to the fuel tank;
 a carbon canister control valve connected to the carbon canister and controlling flow of air/fuel mixture from the carbon canister to the engine for combustion; and
 a controller electronically communicating with the carbon canister control valve for opening and/or closing the carbon canister control valve;

an exhaust system comprising an exhaust conduit and a muffler communicating with the exhaust conduit, the exhaust conduit communicating with the exhaust passage in the cylinder head;

an intake system through which air is fed into the air intake passage; and a supplementary air supply passage for mixing air into the exhaust gas discharged from the combustion chamber.

18. The off-road vehicle of claim 17, wherein the air/fuel mixture from the carbon canister through the carbon canister control valve feeds into a main intake manifold of the engine.

19. The off-road vehicle of claim 17, wherein the fuel supply system further comprises a two-way valve between the fuel tank and the carbon canister.

20. The off-road vehicle of claim 19, wherein the two-way valve comprises:

a valve body defining a passageway, a valve seat within the passageway, the valve seat having at least one through-hole;

a spring within the passageway providing a spring force biasing the valve seat against the valve body to normally close the two-way valve, wherein pressure above ambient within the fuel tank can overcome the spring force for volatiles to flow from the fuel tank to the carbon canister; and a valve element on the valve seat, the valve element having a flexible diaphragm to normally close the at least one through-hole, which can be opened by pressure below ambient within the fuel tank for air to from the carbon canister into the fuel tank.

* * * * *